(12) United States Patent
Penzak

(10) Patent No.: US 8,355,977 B1
(45) Date of Patent: Jan. 15, 2013

(54) SYSTEM, METHOD, AND COMPUTER READABLE MEDIUM FOR ALLOCATING DIVIDENDS TO A BLOCK OF COMMON STOCK SHARES

(76) Inventor: Jason Penzak, Shanghai (CN)

( * ) Notice: Subject to any disclaimer, the term of this patent is extended or adjusted under 35 U.S.C. 154(b) by 0 days.

(21) Appl. No.: 13/331,317

(22) Filed: Dec. 20, 2011

Related U.S. Application Data

(63) Continuation-in-part of application No. 13/156,428, filed on Jun. 9, 2011, now Pat. No. 8,103,572, which is a continuation of application No. 12/277,521, filed on Nov. 25, 2008, now Pat. No. 7,987,131.

(51) Int. Cl.
*G06Q 40/00* (2012.01)
(52) U.S. Cl. .............. 705/36 R; 705/35; 705/37
(58) Field of Classification Search ............ 705/35, 705/36 R, 37
See application file for complete search history.

(56) References Cited

U.S. PATENT DOCUMENTS

| | | | |
|---|---|---|---|
| 6,188,993 B1 * | 2/2001 | Eng et al. ............ | 705/37 |
| 7,020,626 B1 * | 3/2006 | Eng et al. ............ | 705/35 |
| 7,848,998 B1 * | 12/2010 | Dhalla et al. ......... | 705/37 |
| 7,865,426 B2 * | 1/2011 | Volpert .............. | 705/37 |
| 7,953,661 B2 * | 5/2011 | Laskin et al. ......... | 705/40 |
| 8,131,620 B1 * | 3/2012 | Steinberg et al. ..... | 705/36 R |
| 8,175,944 B2 * | 5/2012 | Booraem et al. ...... | 705/35 |
| 2001/0034678 A1 * | 10/2001 | Lerner et al. ......... | 705/35 |
| 2002/0194099 A1 * | 12/2002 | Weiss ................ | 705/36 |
| 2004/0210501 A1 * | 10/2004 | Laskin et al. ......... | 705/35 |
| 2004/0254871 A1 * | 12/2004 | Weiss ................ | 705/36 |
| 2006/0287938 A1 * | 12/2006 | Sherman et al. ....... | 705/35 |
| 2007/0265950 A1 * | 11/2007 | Reuss ................ | 705/36 R |
| 2008/0027846 A1 * | 1/2008 | Brady et al. .......... | 705/36 R |
| 2009/0063325 A1 * | 3/2009 | Tuths ................ | 705/37 |
| 2011/0060676 A1 * | 3/2011 | Jennings ............. | 705/37 |
| 2011/0087621 A1 * | 4/2011 | Broms et al. ......... | 705/36 R |
| 2011/0131068 A1 * | 6/2011 | Lupien et al. ......... | 705/4 |
| 2011/0173136 A1 * | 7/2011 | Broms et al. ......... | 705/36 R |
| 2011/0246245 A1 * | 10/2011 | Coleman ............. | 705/4 |
| 2012/0005118 A1 * | 1/2012 | Mathur ............... | 705/36 R |

* cited by examiner

*Primary Examiner* — Kenneth Bartley
(74) *Attorney, Agent, or Firm* — John F. Buckert; Buckert Patent & Trademark Law Firm, P.C.

(57) ABSTRACT

A system and a method for allocating dividends to stock shares are provided. The method includes creating a sub-class of a first stock share class. The method further includes allocating a first percentage of a total dividend amount to a first plurality of stock shares in the first stock share class. The method further includes allocating a second percentage of the total dividend amount to the second plurality of stock shares in the sub-class of the first stock share class. The method further includes storing the first percentage of the total dividend and the second percentage of the total dividend in a memory device. The method further includes buying-back stock shares in the first stock share class or sub-class of the first stock share class.

16 Claims, 14 Drawing Sheets

500 —

CLIENT COMPUTER DETERMINES THE INITIAL MULTIPLIER VALUE OF THE SECOND PLURALITY OF STOCK SHARES IF THE SECOND PLURALITY OF STOCK SHARES ARE CREATED THROUGH DIRECT SELLING OR AN INITIAL PUBLIC OFFERING UTILIZING THE FOLLOWING EQUATION:

INITIAL MULTIPLIER VALUE OF THE SECOND PLURALITY OF STOCK SHARES = (VALUE OF FUNDS BEING RAISED/NUMBER OF THE SECOND PLURALITY OF STOCK SHARES BEING ISSUED)/MONETARY VALUE OF EACH STOCK SHARE OF THE FIRST PLURALITY OF STOCK SHARES

502 —

CLIENT COMPUTER STORES THE INITIAL MULTIPLIER VALUE OF THE SECOND PLURALITY OF STOCK SHARES IN A MEMORY DEVICE

100

CLIENT COMPUTER DETERMINES THE INITIAL CLASS NO-DIVIDEND COMMON STOCK SHARE MULTIPLIER VALUE UTILIZING THE FOLLOWING EQUATION: CLASS NO-DIVIDEND STOCK SHARE MULTIPLIER VALUE = (NUMBER OF CLASS A COMMON STOCK SHARES / BLOCK SIZE PERCENTAGE OF THE CLASS A COMMON STOCK SHARES) / (NUMBER OF CLASS NO-DIVIDEND COMMON STOCK SHARES / BLOCK SIZE PERCENTAGE OF THE CLASS NO-DIVIDEND COMMON STOCK SHARES)

CLIENT COMPUTER DETERMINES THE UPDATED NUMBER OF CLASS A COMMON STOCK SHARES AND UPDATED NUMBER OF CLASS NO-DIVIDEND COMMON STOCK SHARES

112

CLIENT COMPUTER DETERMINES THE UPDATED CLASS NO-DIVIDEND COMMON STOCK SHARE MULTIPLIER VALUE BY USING THE FOLLOWING EQUATION: UPDATED CLASS NO-DIVIDEND COMMON STOCK SHARE MULTIPLIER VALUE = (UPDATED NUMBER OF CLASS A COMMON STOCK SHARES / BLOCK SIZE PERCENTAGE OF THE CLASS A COMMON STOCK SHARES) / (UPDATED NUMBER OF CLASS NO-DIVIDEND COMMON STOCK SHARES / BLOCK SIZE OF PERCENTAGE OF THE CLASS NO-DIVIDEND COMMON STOCK SHARES)

| CLIENT COMPUTER DETERMINES THE ADJUSTED FIRST MULTIPLIER VALUE OF THE SECOND PLURALITY OF STOCK SHARES UTILIZING THE FOLLOWING EQUATION:<br><br>ADJUSTED FIRST MULTIPLIER VALUE OF THE SECOND PLURALITY OF STOCK SHARES = PRIOR PERIOD FIRST MULTIPLIER VALUE OF THE SECOND PLURALITY STOCK SHARE+(( PRIOR PERIOD FIRST MULTIPLIER VALUE OF THE SECOND PLURALITY STOCK SHARE*( DIVIDEND AMOUNT OF EACH STOCK SHARE OF THE FIRST PLURALITY OF STOCK SHARES /( MONETARY VALUE OF EACH STOCK SHARE OF EACH STOCK SHARE OF THE FIRST PLURALITY OF STOCK SHARES - DIVIDEND AMOUNT OF EACH STOCK SHARE OF THE FIRST PLURALITY OF STOCK SHARES)))* PERCENTAGE OF THE FIRST PLURALITY OF STOCK SHARES DIVIDEND ALLOCATION AFFECTING THE FIRST MULTIPLIER VALUE)-((( DIVIDEND AMOUNT OF EACH STOCK SHARE OF THE SECOND PLURALITY OF STOCK SHARES * PERCENTAGE OF THE SECOND PLURALITY OF STOCK SHARES DIVIDEND ALLOCATION AFFECTING THE FIRST MULTIPLIER VALUE)/( MONETARY VALUE OF EACH STOCK SHARE OF THE FIRST PLURALITY OF STOCK SHARES - DIVIDEND AMOUNT OF EACH STOCK SHARE OF THE FIRST PLURALITY OF STOCK SHARES)))+((( DIVIDEND AMOUNT OF EACH STOCK SHARE OF THE THIRD PLURALITY OF STOCK SHARES *(1- PERCENTAGE OF THE THIRD PLURALITY OF STOCK SHARES DIVIDEND ALLOCATION AFFECTING THE SECOND MULTIPLIER VALUE))/( MONETARY VALUE OF EACH STOCK SHARE OF THE FIRST PLURALITY OF STOCK SHARES - DIVIDEND AMOUNT OF EACH STOCK SHARE OF THE FIRST PLURALITY OF STOCK SHARES))* PRIOR PERIOD SECOND MULTIPLIER VALUE OF THE SECOND PLURALITY OF STOCK SHARES) |

1202

| CLIENT COMPUTER STORES THE ADJUSTED FIRST MULTIPLIER VALUE OF THE SECOND PLURALITY OF STOCK SHARES IN A MEMORY DEVICE |

CLIENT COMPUTER DETERMINES THE ADJUSTED SECOND MULTIPLIER VALUE OF THE SECOND PLURALITY OF STOCK SHARES UTILIZING THE FOLLOWING EQUATION:

ADJUSTED SECOND MULTIPLIER VALUE OF THE SECOND PLURALITY OF STOCK SHARES = PRIOR PERIOD SECOND MULTIPLIER VALUE OF THE SECOND PLURALITY OF STOCK SHARES +(( PRIOR PERIOD SECOND MULTIPLIER VALUE OF THE SECOND PLURALITY OF STOCK SHARES *( DIVIDEND AMOUNT OF EACH STOCK SHARE OF THE THIRD PLURALITY OF STOCK SHARES /( MONETARY VALUE OF EACH STOCK SHARE OF THE THIRD PLURALITY OF STOCK SHARES - DIVIDEND AMOUNT OF EACH STOCK SHARE OF THE THIRD PLURALITY OF STOCK SHARES)))* PERCENTAGE OF THE THIRD PLURALITY OF STOCK SHARES DIVIDEND ALLOCATION AFFECTING THE SECOND MULTIPLIER VALUE)-((( DIVIDEND AMOUNT OF EACH STOCK SHARE OF THE SECOND PLURALITY OF STOCK SHARES *(1- PERCENTAGE OF THE SECOND PLURALITY OF STOCK SHARES DIVIDEND ALLOCATION AFFECTING THE FIRST MULTIPLIER VALUE))/( MONETARY VALUE OF EACH STOCK SHARE OF THE THIRD PLURALITY OF STOCK SHARES - DIVIDEND AMOUNT OF EACH STOCK SHARE OF THE THIRD PLURALITY OF STOCK SHARES)))+((( DIVIDEND AMOUNT OF EACH STOCK SHARE OF THE FIRST PLURALITY OF STOCK SHARES *(1- PERCENTAGE OF THE FIRST PLURALITY OF STOCK SHARES DIVIDEND ALLOCATION AFFECTING THE FIRST MULTIPLIER VALUE))/( MONETARY VALUE OF EACH STOCK SHARE OF THE THIRD PLURALITY OF STOCK SHARES - DIVIDEND AMOUNT OF EACH STOCK SHARE OF THE THIRD PLURALITY OF STOCK SHARES))* PRIOR PERIOD FIRST MULTIPLIER VALUE OF THE SECOND PLURALITY OF STOCK SHARES)

1302

CLIENT COMPUTER STORES THE ADJUSTED SECOND MULTIPLIER VALUE OF THE SECOND PLURALITY OF STOCK SHARES IN A MEMORY DEVICE

FIG. 19

FIRST PLURALITY OF STOCK SHARES = CLASS A — 250

MULTIPLIER VALUE

SECOND PLURALITY OF STOCK SHARES = SUB-CLASS A — 252

FIG. 20

SYSTEM, METHOD, AND COMPUTER READABLE MEDIUM FOR ALLOCATING DIVIDENDS TO A BLOCK OF COMMON STOCK SHARES

CROSS REFERENCE TO RELATED APPLICATIONS

The present application is a continuation-in-part of U.S. patent application Ser. No. 13/156,428 filed on Jun. 9, 2011. The U.S. patent application Ser. No. 13/156,428 is a continuation of U.S. patent application Ser. No. 12/277,521 filed on Nov. 25, 2008.

TECHNICAL FIELD

This application relates generally to a system and a method for allocating dividends to classes of stock shares and sub-classes of the stock shares.

BACKGROUND OF THE INVENTION

Investors who desire customized cash flows often need to pay high fees to investment professionals, insurance companies or financial institutions to create customized investment instruments.

Furthermore, investors are often forced to make a tradeoff between relatively high and stable cash flows with low expected long-term returns versus relatively low cash flows with high expected long-term returns. Specifically, investors are often forced to make a trade-off between investing in fixed income-styled instruments versus equity-styled instruments.

Furthermore, companies may desire to create investment vehicles that are attractive to investors with certain investment requirements, or may want to make adjustments to the cash outflows associated with dividends without disadvantaging any shareholders or signaling distress to the marketplace.

Accordingly, the inventor herein has recognized the following: (i) a need for an improved system and method for allocating dividends to a plurality of classes and sub-classes of shares that addresses the need for customized investment instruments, and (ii) a need to help companies craft investment vehicles for specific investors that can be supported by the companies' current and future dividend policies.

SUMMARY OF THE INVENTION

A method for allocating dividends to stock shares in accordance with an exemplary embodiment is provided. The method includes determining a total dividend amount for a group of stock shares utilizing a computer. The group of stock shares has a first plurality of stock shares in a first stock share class and a second plurality of stock shares in a sub-class of the first stock share class. The sub-class of the first stock share class has at least one characteristic that is determined based on at least one characteristic of the first stock share class and a multiplier value. The multiplier value is adjusted over time. The method further includes allocating a first percentage of the total dividend amount to the first plurality of stock shares in the first stock share class. The method further includes allocating a second percentage of the total dividend amount to the second plurality of stock shares in the sub-class of the first stock share class. The method further includes storing the first percentage of the total dividend amount and the second percentage of the total dividend amount in a memory device, utilizing the computer.

A system for allocating dividends to stock shares in accordance with another exemplary embodiment is provided. The system includes a first computer configured to determine a total dividend amount for a group of stock shares. The group of stock shares has a first plurality of stock shares in a first stock share class and a second plurality of stock shares in a sub-class of the first stock share class. The sub-class of the first stock share class has at least one characteristic that is determined based on at least one characteristic of the first stock share class and a multiplier value. The multiplier value is adjusted over time. The first computer is further configured to allocate a first percentage of the total dividend amount to the first plurality of stock shares in the first stock share class. The first computer is further configured to allocate a second percentage of the total dividend amount to the second plurality of stock shares in the sub-class of the first stock share class. The first computer is further configured to store the first percentage of the total dividend amount and the second percentage of the total dividend amount in a memory device.

A method for determining a monetary value for a group of stock shares in accordance with another exemplary embodiment is provided. The group of stock shares has a first plurality of stock shares in a first stock share class and a second plurality of stock shares in a sub-class of the first stock share class. The sub-class of the first stock share class has at least one characteristic that is determined based on at least one characteristic of the first stock share class and a multiplier value. The multiplier value is adjusted over time. The method includes adjusting the multiplier value of the second plurality of stock shares in the sub-class of the first stock share class based on a prior period multiplier value of the second plurality of stock shares, a dividend amount of each stock share of the first plurality of stock shares, a monetary value of each stock share of the first plurality of stock shares, and a dividend amount of each stock share of the second plurality of stock shares, utilizing a computer. The method further includes determining a monetary value of each stock share of the second plurality of stock shares by utilizing the multiplier value and the monetary value of each stock share of the first plurality of stock shares. The method further includes storing the multiplier value of the second plurality of stock shares in the sub-class of the first stock share class in a memory device, utilizing the computer.

A system for determining a monetary value for a group of stock shares in accordance with another exemplary embodiment is provided. The group of stock shares has a first plurality of stock shares in a first stock share class and a second plurality of stock shares in a sub-class of the first stock share class. The sub-class of the first stock share class has at least one characteristic that is determined based on at least one characteristic of the first stock share class and a multiplier value. The multiplier value is adjusted over time. The system includes a first computer configured to adjust the multiplier value of the second plurality of stock shares in the sub-class of the first stock share class based on a prior period multiplier value of the second plurality of stock shares, a dividend amount of each stock share of the first plurality of stock shares, a monetary value of each stock share of the first plurality of stock shares, and a dividend amount of each stock share of the second plurality of stock shares. The first computer is further configured to determine a monetary value of each stock share of the second plurality of stock shares by utilizing the multiplier value and a monetary value of each stock share of the first plurality of stock shares. The first computer is further configured to store the adjusted multiplier value of the second plurality of stock shares in the sub-class of the first stock share class in a memory device.

A method for allocating dividends to a group of stock shares in accordance with another exemplary embodiment is provided. The group of stock shares has a first plurality of stock shares in a first stock share class, a third plurality of stock shares in a second stock share class, and a second plurality of stock shares in both a sub-class of the first stock share class and a sub-class of the second stock share class. The second plurality of stock shares have at least one characteristic determined based on at least one characteristic of the first stock share class and a first multiplier value, and at least one characteristic of the second stock share class and a second multiplier value. The first and second multiplier values are adjusted over time. The method includes determining a total dividend amount for the group of stock shares, utilizing a computer. The method further includes allocating a first percentage of the total dividend amount to the first plurality of stock shares in the first stock share class. The method further includes allocating a second percentage of the total dividend amount to the second plurality of stock shares in both the sub-class of the first stock share class and the sub-class of the second stock share class. The method further includes allocating a third percentage of the total dividend amount to the third plurality of stock shares in the second stock share class. The method further includes storing the first percentage of the total dividend amount, the second percentage of the total dividend amount, and the third percentage of the total dividend amount in a memory device, utilizing the computer.

A system for allocating dividends to a group of stock shares in accordance with another exemplary embodiment is provided. The group of stock shares has a first plurality of stock shares in a first stock share class, a third plurality of stock shares in a second stock share class, and a second plurality of stock shares in both a sub-class of the first stock share class and a sub-class of the second stock share class. The second plurality of stock shares have at least one characteristic determined based on at least one characteristic of the first stock share class and a first multiplier value, and at least one characteristic of the second stock share class and a second multiplier value. The first and second multiplier values are adjusted over time. The system includes a first computer configured to determine a total dividend amount for the group of stock shares. The first computer is further configured to allocate a first percentage of the total dividend amount to the first plurality of stock shares in the first stock share class. The first computer is further configured to allocate a second percentage of the total dividend amount to the second plurality of stock shares in both the sub-class of the first stock share class and the sub-class in the second stock share class. The first computer is further configured to allocate a third percentage of the total dividend amount to the third plurality of stock shares in the second stock share class. The first computer is further configured to store the first percentage of the total dividend amount, the second percentage of the total dividend amount, and the third percentage of the total dividend amount in a memory device.

A method for determining an adjusted first multiplier value and an adjusted second multiplier value associated with a group of stock shares in accordance with another exemplary embodiment is provided. The group of stock shares has a first plurality of stock shares in a first stock share class, a third plurality of stock shares in a second stock share class, and a second plurality of stock shares in both a sub-class of the first stock share class and a sub-class of the second stock share class. The second plurality of stock shares have at least one characteristic determined based on at least one characteristic of the first stock share class and a first multiplier value, and at least one characteristic of the second stock share class and a second multiplier value. The first and second multiplier values are adjusted over time. The method includes adjusting the first multiplier value of the second plurality of stock shares based on a prior period first multiplier value of the second plurality of stock shares, a dividend amount of each stock share of the first plurality of stock shares, a monetary value of each stock share of the first plurality of stock shares, a percentage of the first plurality of stock shares dividend allocation affecting the first multiplier value, a dividend amount of each stock share of the second plurality of stock shares, a percentage of the second plurality of stock shares dividend allocation affecting the first multiplier value, a dividend amount of each stock share of the third plurality of stock shares, a percentage of the third plurality of stock shares dividend allocation affecting the second multiplier value, a prior period second multiplier value of the second plurality of stock shares, utilizing a computer. The method further includes adjusting the second multiplier value of the second plurality of stock shares based on the prior period second multiplier value of the second plurality of stock shares, the dividend amount of each stock share of the third plurality of stock shares, a monetary value of each stock share of the third plurality of stock shares, the percentage of the third plurality of stock shares dividend allocation affecting the second multiplier value, the dividend amount of each stock share of the second plurality of stock shares, the percentage of the second plurality of stock shares dividend allocation affecting the first multiplier value, the dividend amount of each stock share of the first plurality of stock shares, the percentage of the first plurality of stock shares dividend allocation affecting the first multiplier value, and the prior period first multiplier value of the second plurality of stock shares, utilizing the computer. The method further includes storing the first multiplier value of the second plurality of stock shares and the second multiplier value of the second plurality of stock shares in a memory device, utilizing the computer.

A system for determining an adjusted first multiplier value and an adjusted second multiplier value associated with a group of stock shares in accordance with another exemplary embodiment is provided. The group of stock shares has a first plurality of stock shares in a first stock share class, a third plurality of stock shares in a second stock share class, and a second plurality of stock shares in both a sub-class of the first stock share class and a sub-class of the second stock share class. The second plurality of stock shares have at least one characteristic determined based on at least one characteristic of the first stock share class and a first multiplier value, and at least one characteristic of the second stock share class and a second multiplier value. The first and second multiplier values are adjusted over time. The system includes a first computer configured to adjust the first multiplier value of the second plurality of stock shares based on a prior period first multiplier value of the second plurality of stock shares, a dividend amount of each stock share of the first plurality of stock shares, a monetary value of each stock share of the first plurality of stock shares, a percentage of the first plurality of stock shares dividend allocation affecting the first multiplier value, a dividend amount of each stock share of the second plurality of stock shares, a percentage of the second plurality of stock shares dividend allocation affecting the first multiplier value, a dividend amount of each stock share of the third plurality of stock shares, a percentage of the third plurality of stock shares dividend allocation affecting the second multiplier value, and a prior period second multiplier value of the second plurality of stock shares. The first computer is further configured to adjust the second multiplier value of the second plurality of stock shares based on the prior period second multiplier value of the second plurality of stock shares, the dividend amount of each stock share of the third plurality of stock shares, a monetary value of each stock share of the third plurality of stock shares, the percentage of the third plurality of stock shares dividend allocation affecting the second multiplier value, the dividend amount of each stock share of the second plurality of stock shares, the percentage of the second plurality of stock shares dividend allocation affecting the first multiplier value, the dividend amount of each stock share of the first plurality of stock shares, the percentage of the first plurality of stock shares dividend allocation affecting the first multiplier value, and the prior period first multiplier value of the second plurality of stock shares. The first computer is further configured to store the first multiplier value of the second plurality of stock shares and the second multiplier value of the second plurality of stock shares in a memory device.

BRIEF DESCRIPTION OF THE DRAWINGS

FIG. 6 is a flowchart of a method for determining an initial Class No-Dividend common stock share multiplier value.

FIG. 7 is a flowchart of a method for determining the adjusted Class No-Dividend common stock share multiplier value.

FIG. 18 is a flowchart of a method for determining an adjusted first multiplier value for a second plurality of stock shares in a sub-class of a first stock share class and in a second stock share class in a dual-sub-class scenario in accordance with another exemplary embodiment.

FIG. 19 is a flowchart of a method for determining an adjusted second multiplier value for a second plurality of stock shares in both a sub-class of the first stock share class and a sub-class of a second stock share class in a dual-sub-class scenario in accordance with another exemplary embodiment.

FIG. 20 is a block diagram showing a second plurality of stock shares in a sub-class of a first stock share class in a single-sub-class scenario relative to a first plurality of stock shares in a first stock share class via the multiplier value.

DETAILED DESCRIPTION OF EXEMPLARY EMBODIMENTS

Figure 1:
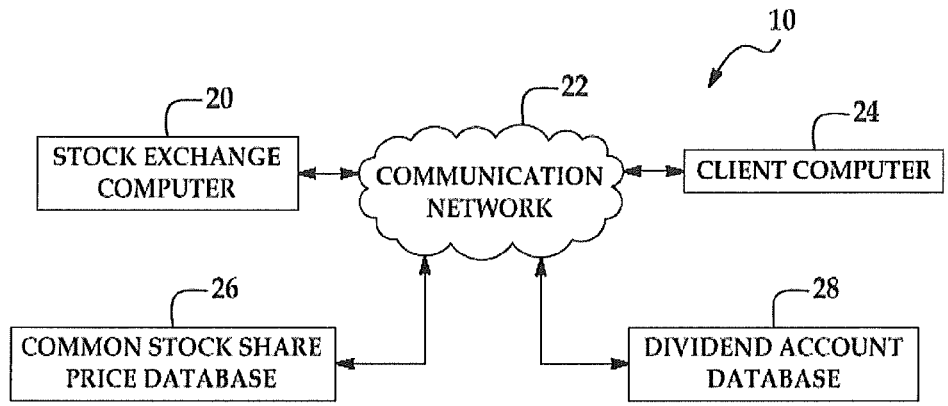
FIG. 1 is a schematic of a system that maintains control over outstanding Class A common stock shares and Class No-Dividend common stock shares along with dividends attributable to each class of stock in accordance with an exemplary embodiment.

Referring to FIG. 1, a system 10 for allocating dividends to a block of common stock shares is provided. The system 10 includes a stock exchange computer 20, a communication network 22, a client computer 24, a common stock share price database 26, and a dividend account database 28. It should be noted that the term "company" means any legal entity that can issue stock shares such as common stock shares for example. The term "stock share" means a share of ownership of a company. Further, the term "share buyback" or "buyback" (also referred to as share repurchase) refers to a company buying back its own stock shares. Thereafter, the company retires (or holds in Treasury inventory) the buyback stock shares. The term "percentage" refers to either an actual percentage value or a decimical equivalent. The term "stock exchange computer" refers to any device or computer configured to initiate a request for a stock transaction or to perform the stock transaction, such a sell transaction or a buy transaction for example. The term "client computer" refers to any device or computer configured to communicate with another device or computer. The term "computer" refers to any device configured to perform a logical operation or an arithmetic operation.

A general overview of a methodology utilized by the system 10 will now be explained. In particular, the methodology is designed to satisfy both groups of investors, those who prefer to receive dividends from common stock and those who do not prefer to receive dividends. In particular, the methodology creates an additional class of common stock, called Class No-Dividend common stock shares, that are traded alongside standard Class A common stock shares of the same company. The Class No-Dividend common stock shares and the Class A common stock shares form a block of common stock shares. The methodology is intended for companies that plan to continue paying dividends to its Class A common Stock shareholders. The Class No-Dividend common stock shares have characteristics similar to Class A common stock shares, but instead of receiving dividends, an amount of money that the company would normally set aside to pay dividends to Class No-Dividend common stock shares is used to buy back other Class No-Dividend common stock shares.

The Class No-Dividend common stock shares enhance returns for long-term investors by reducing transaction costs and allowing the investor to avoid investing at inopportune times. Further, as compared to Class A common stock shares, a change in value of Class No-Dividend common stock shares over time more accurately reflects a true financial performance of the company because it captures total return to shareholders. Therefore, Class No-Dividend common stock shares are arguably a better basis for various forms of management compensation such as stock options, stock appreciation rights, and stock grants than if based on existing Class A common stock shares.

The stock exchange computer 20 is configured to perform requests to buy or sell Class A common stock shares and Class No-Dividend common stock shares of a company, in response to requests from the client computer 24. The stock exchange computer 20 is further configured to be able to convert a certain number or percent of Class A common stock shares into Class No-Dividend common stock shares as directed from the client computer 24 using the information in dividend account database 28. The stock exchange computer 20 is further configured to be able to issue a certain number of Class No-Dividend common stock shares to owners of existing Class A common stock shares in accordance with direction from the client computer 24 using the information in dividend account database 28. The stock exchange computer 20 is further configured to retrieve current trading prices of Class A common stock shares and Class No-Dividend common stock shares from the common stock share price database 26. As shown, the stock exchange computer 20 is operably coupled to a communication network 22. The communication network 22 is further operably coupled to the client computer 24, the common stock share price database 26, and the dividend account database 28.

The client computer 24 is configured to send requests to the stock exchange computer 20 to buy or sell Class A common stock shares and Class No-Dividend common stock shares of a company. The client computer 24 is further configured to store data indicating dividend amounts in dividend accounts of stock share owners stored in the dividend account database 28. The client computer 24 is further configured to perform additional calculations as will be described in greater detail below and to store determined values in an internal memory device.

Figure 2:
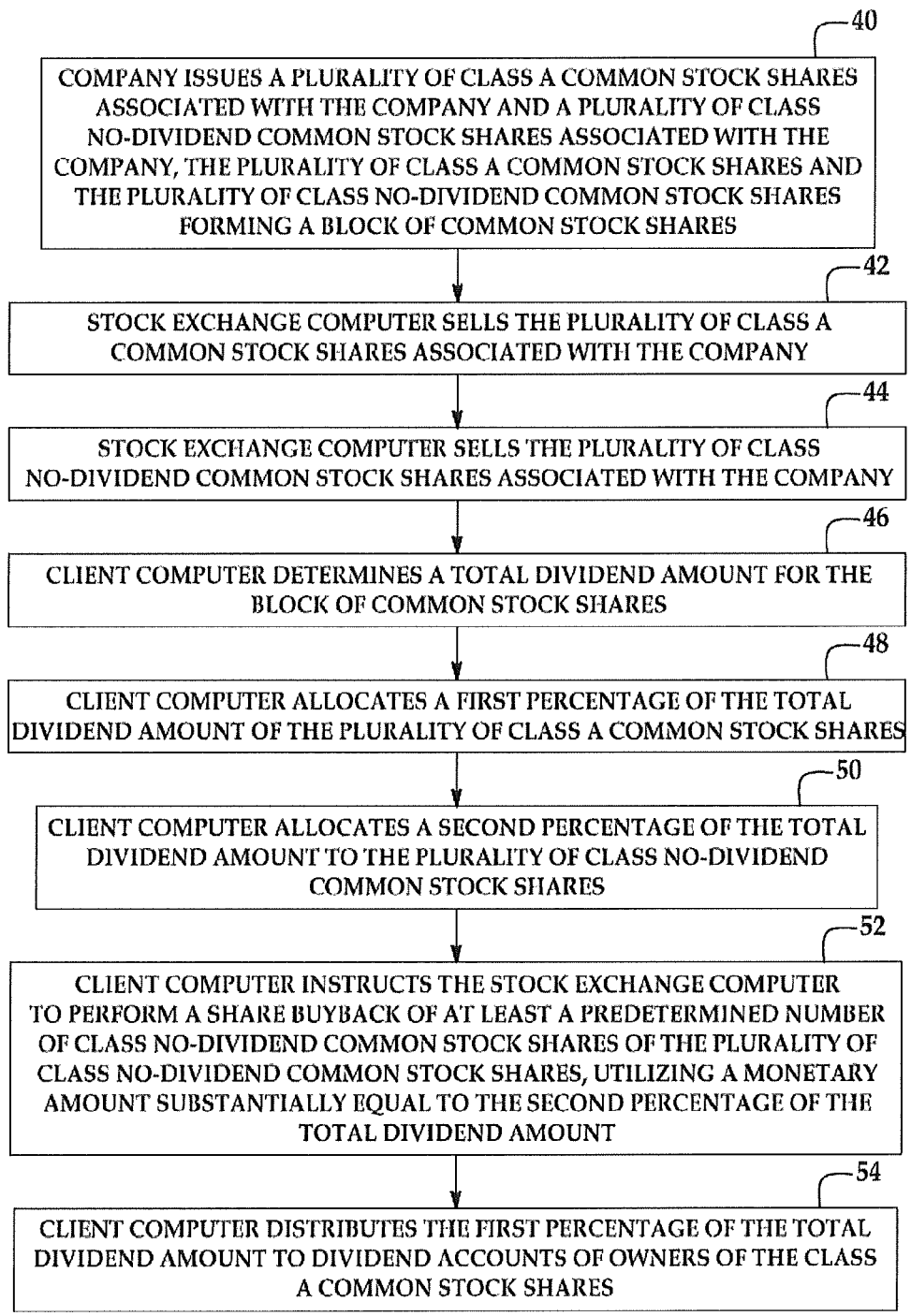
FIG. 2 is a flowchart of a method for allocating dividends to a block of common stock shares in accordance with another exemplary embodiment.

Referring to FIG. 2, a flowchart of a method for allocating dividends to a block of common stock shares in accordance with another exemplary embodiment will now be explained. The method can be implemented utilizing the system 10 described above.

At step 40, a company issues a plurality of Class A common stock shares associated with the company and a plurality of Class No-Dividend common stock shares associated with the company. If the company previously issued Class A common stock shares, then the company may choose not to issue any additional Class A common stock shares and the stock exchange computer 20 can be configured to be flexible in this manner. In either case, the plurality of Class A common stock shares and the plurality of Class No-Dividend common stock shares form a block of common stock shares.

At step 42, based on direction from the client computer 24, the stock exchange computer 20 may sell or issue a plurality of Class A common stock shares associated with the company, particularly if no Class A common stock shares previously exist.

At step 44, based on direction from the client computer 24, the stock exchange computer 20 may sell or issue a plurality of Class No-Dividend common stock shares associated with the company.

At step 46, the client computer 24 determines a total dividend amount for the block of common stock shares, both Class A common stock shares and Class No-dividend common stock shares.

At step 48, the client computer 24 allocates a first percentage of the total dividend amount to the plurality of Class A common stock shares.

At step 50, the client computer 24 allocates a second percentage of the total dividend amount to the plurality of Class No-Dividend common stock shares.

At step 52, the client computer 24 instructs the stock exchange computer 20 to perform a share buyback of a predetermined number of Class No-Dividend common stock shares of the plurality of Class No-Dividend common stock shares, utilizing a monetary amount substantially equal to the second percentage of the total dividend amount.

At step 54, the client computer 24 distributes the first percentage of the total dividend amount to dividend accounts of owners of the Class A common stock shares. In one exemplary embodiment, the client computer 24 stores data indicating a distribution or dividend amount equal to the first percentage of the total dividend amount in dividend accounts of owners of the Class A common stock shares, on the dividend account database 28.

Figure 3:
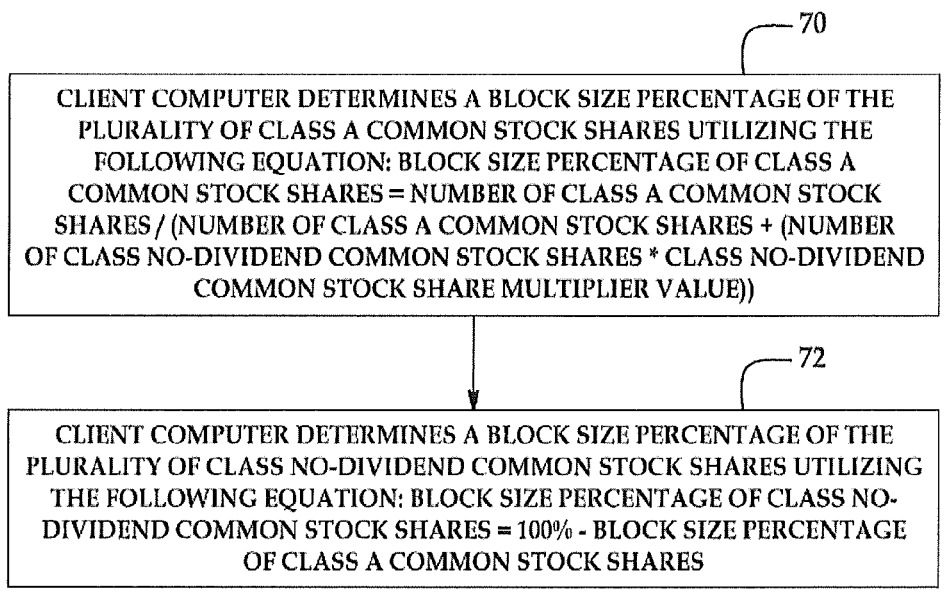
FIG. 3 is a flowchart of a method for determining the block size percentages of Class A common stock shares and the Class No-Dividend common stock shares.

Referring to FIG. 3, a flowchart of a method for determining the block size percentages of the Class A common stock shares and the Class No-Dividend common stock shares will now be explained.

At step 70, the client computer 24 determines a block size percentage of the plurality of Class A common stock shares utilizing the following equation: Block size percentage of Class A common stock shares=number of Class A common stock shares/(number of Class A common stock shares+(number of Class No-Dividend common stock shares*Class No-Dividend common stock share multiplier value)).

At step 72, the client computer 24 determines a block size percentage of the plurality of Class No-Dividend common stock shares utilizing the following equation: Block size percentage of Class No-Dividend common stock shares=100%−Block size percentage of Class A common stock shares.

Exemplary calculations utilizing the methodology of FIG. 3 will now be explained. Assume that an existing company has 200 Class A common stock shares outstanding. Subsequently, the company issues 100 Class No-Dividend common stock shares—via a stock split, special dividend, or other method. Further, assume that the company desires that the Class No-Dividend common stock shares trade at a nominal value of 3-times the price of Class A common stock shares. Implicitly, this would mean that the starting Class No-Dividend common stock share multiplier value would be 3.00.

For the foregoing example, the block size percentage of Class A common stock shares would be calculated as follows: 200/(200+(100×3.00))=0.4 (i.e., 40%). Further, the block size percentage of the Class No-Dividend common stock shares would be calculated as follows: 100%−40%=60%.

Figure 4:
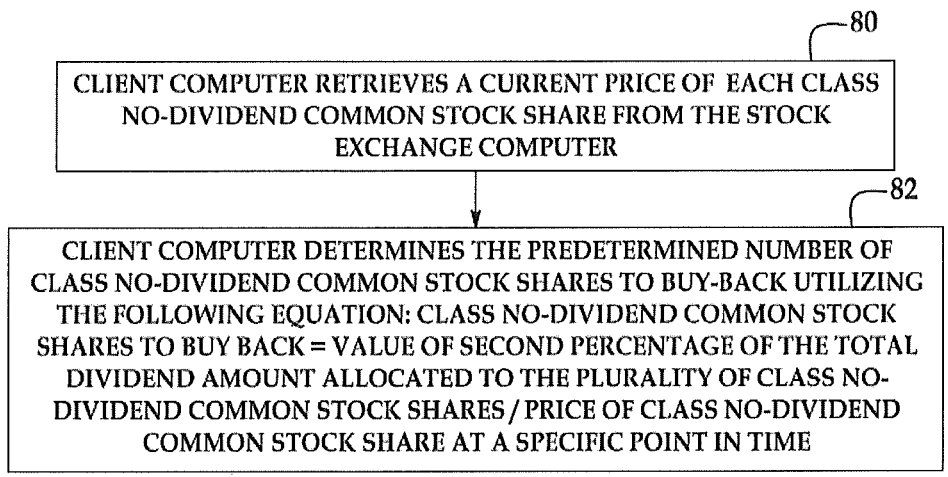
FIG. 4 is a flowchart of a method for determining a predetermined number of Class No-Dividend common stock shares for a share buyback by a company.

Referring to FIG. 4, a flowchart of a method for determining the predetermined number of Class No-Dividend common stock shares for the share buyback by the company will now be explained.

At step 80, the client computer 24 retrieves a current price of each Class No-Dividend common stock share from the stock exchange computer 20.

At step 82, the client computer 24 determines the predetermined number of Class No-Dividend common stock shares to buyback utilizing the following equation:

Class No-Dividend common stock shares to buyback=value of second percentage of the total dividend amount allocated to the plurality of Class No-Dividend common stock shares/the price of Class No-Dividend common stock share at a specific point in time.

A first set of exemplary calculations utilizing the methodology of FIG. 4 will now be explained. For this example, assume that 200 Class A common stock shares and 100 Class No-Dividend common stock shares have been sold, and a No-Dividend common stock share multiplier value equal to 3.00. Further, the price (on a particular day) of Class A common stock shares is $10 per share. Accordingly, the price of Class No-Dividend common stock shares would trade at about $30 per share based on the No-Dividend common stock share multiplier value of 3.00. Also, assume the block size percentages determined in step 72 remain unchanged. When a total dividend amount of $500 is paid to all common stock shareholders, the following events would occur. With 200 Class A common stock shares outstanding, a dividend amount of $200 ($500 total dividend*40% block size percentage of Class A common stock shares) would be paid to only Class A common stock shareholders, with each shareholder receiving $1. This equates to a 10% dividend yield ($1 Dividend/$10 price of each Class A common stock shares). The remaining dividend amount of $300 ($500 total dividend*60% block size percentage of Class No-Dividend common stock shares) is used by the company to buy back Class No-Dividend common stock shares. Accordingly, a number of Class No-Dividend common stock shares purchased for the share buyback is calculated as follows: $300/$30=10 shares.

Also note that after the first dividend is issued (and shares are bought back), the block size percentages would still be the same, but the number of Class No-Dividend common stock shares outstanding would decrease from 100 to 90 shares. Intuitively, the No-Dividend common stock share multiplier value would start to increase as fewer Class No-Dividend common stock shares each get a larger portion of the Class No-Dividend common stock block. Further, the increase of the multiplier value is a function of the dividend yield based on the following two equations.

Change in No-Dividend common stock share multiplier value=1/(1−Class A common stock share dividend yield). In the above example, the change in the No-Dividend common stock share multiplier value=1/(1−10%)=1.11.

Updated No-Dividend common stock share multiplier value=previous No-Dividend common stock share multiplier value*change in No-Dividend common stock share multiplier value. In the above example, the updated No-Dividend common stock share multiplier value=3.00*1.11=3.33.

Figure 5:
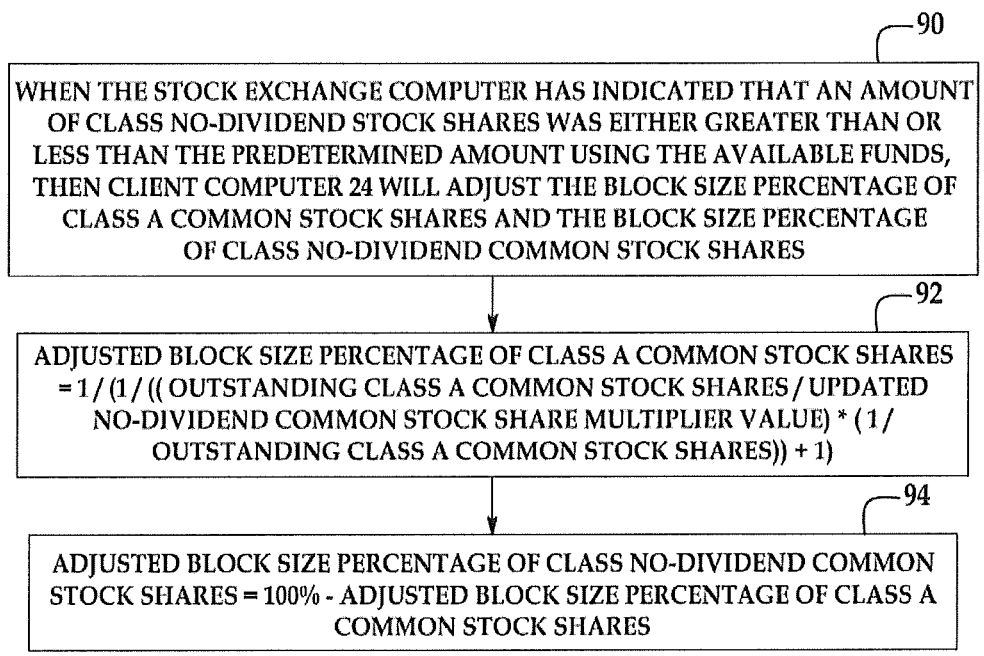
FIG. 5 is a flowchart of a method for determining an adjusted block size percentage of Class A common stock shares and an adjusted block size percentage of Class No-Dividend common stock shares.

Referring to FIG. 5, a flowchart of a method for determining an adjusted block size percentage of Class A common stock shares and an adjusted block size percentage of Class No-Dividend common stock shares if the second percentage of the total dividend amount to the plurality of Class No-Dividend common stock shares does not equal the predetermined number of Class No-Dividend common stock shares to be bought back by the company. Because the market place is dynamic and prices of these classes of shares can move dramatically in very short periods of time, it is reasonable that the buyback may involve either fewer or more shares than what was predetermined. In this case, the client computer 24 will perform the necessary adjustments to the block size percentages. Also note that the client computer 24 is programmed to keep track of the number of outstanding Class A common stock shares and the number of outstanding Class No-Dividend common stock shares.

At step 90, if the feedback from the exchange server 20 has indicated that an amount of Class No-Dividend common stock shares was either greater than or less than the predetermined amount using the available funds, then the client computer 24 will adjust the block size percentage of Class A common stock shares and the block size percentage of Class No-Dividend common stock shares using the following two equations.

At step 92, the client computer 24 determines the adjusted block size percentage of Class A common shares. Adjusted block size percentage of Class A common stock shares=1/(1/((Outstanding Class A common stock shares/Updated No-Dividend common stock share multiplier value)*(1/Outstanding Class A common stock shares))+1).

At step 94, the client computer 24 determines the adjusted block size percentage of Class No-Dividend common shares. Adjusted block size percentage of Class No-Dividend common stock shares=100%−Adjusted block size percentage of Class A common stock shares.

A second set of exemplary calculations utilizing the methodology of FIG. 5 will now be explained. Continuing with the same example described in the first set of exemplary calculations, now assume that the price of Class No-Dividend stock shares cannot be purchased at $30, but rather at an average price of $33.33, ceteris paribus. With the available funds of $300, only 9 shares can be repurchased. The number of outstanding Class A common stock shares remains unchanged at 200 and the number of outstanding Class No-Dividend common stock shares is 91 (100 shares initially issued−9 shares bought back). Using the formula from step 90, the adjusted block size percentage of Class A common stock shares would be 39.759%=1/(1/((200/3.33)*(1/91))+1). Therefore the adjusted block size percentage of Class No-Dividend common stock shares would be 60.241%=100%−39.759% block size of Class A common stock shares.

Referring to FIG. 5, a method for determining the adjusted block size percentage of Class A common stock shares and adjusted block size percentage of Class No-Dividend common stock shares in the event that either a number of Class No-Dividend common stock shares or a number of Class A common stock shares are used for management compensation and recapitalizing activities.

Continuing with assumptions in the second set of exemplary calculations, now assume that as a result of management compensation (stock options for example) or additional capital required by the company, an additional 20 Class No-Dividend common stock shares are either created or sold in the market place. The method described in FIG. 5 would then make the necessary adjustments. With the number of outstanding Class A common stock shares remaining unchanged at 200, but an increase in the number of Class No-Dividend common stock shares from 91 to 111, the client computer 24 would make the following adjustment. Also note, in this example, as no dividend is being paid, there is no change to the updated No-Dividend common stock share multiplier, so it would remain at 3.33. Using the formula in step 92, the adjusted block size percentage of Class A common stock shares would be 35.111%=1/(1/((200/3.33)*(1/111))+1). Therefore the adjusted block size percentage of Class No-Dividend common stock shares would be 64.889%=100%−35.111% block size of Class A common stock shares.

Referring to FIG. 6, a method for determining an initial Class No-Dividend common stock share multiplier value will now be explained.

At step 100, the client computer 24 determines the initial Class No-Dividend common stock share multiplier value utilizing the following equation:

> Class No-Dividend common stock share multiplier value=(number of Class A common stock shares/block size percentage of the Class A common stock shares)/(number of Class No-Dividend common stock shares/block size percentage of the Class No-Dividend common stock shares).

Exemplary calculations utilizing the methodology of FIG. 6 will now be explained. For this example, assume that the block sizes for the Class A common stock shares and the Class No-Dividend common stock shares are known, but the nominal prices per share have not been set. For example, assume that a company has 200 Class A common stock shares outstanding. Thereafter, the company issues 100 Class No-Dividend common stock shares. Also assume that the company desires that the block size percentage of Class A common shares to be about 75% and the block size percentage of Class No-Dividend Block Size to be about 25%. The No-Dividend common stock share multiplier value can be determined utilizing the following equation: No-Dividend common stock share multiplier value=(Outstanding Class A common stock shares/block size percentage of Class A common stock shares)/(Outstanding Class No-Dividend common stock shares/block size percentage of Class No-Dividend common stock shares). For example, with the above criteria, the Class No-Dividend common stock share multiplier value=(200/75%)/(100/25%)=0.667. In this example, if the Class A common stock shares were trading for $10 per share, the Class No-Dividend common stock shares should be trading for about $6.67 per share. In addition to determining the relative prices between Class A common stock shares and Class No-Dividend common stock shares, the No-Dividend common stock share multiplier value also determines the relative level of entitlement due to each shareholder. In this example, with respect to future earnings, one share of Class No-Dividend common stock share would be entitled to 66.7% of earnings that Class A common stock share would be entitled to. Also, with respect to voting, one share of Class No-Dividend common stock share would be entitled to 0.667 votes that every 1.000 vote of Class A common stock share would be entitled to. Over time, as the No-Dividend common stock share multiplier value changes, so too will the entitlements of a Class No-Dividend common stock share change relative to a Class A common stock share.

The system and the method for allocating dividends provide a substantial advantage over other systems and methods. In particular, the system and method provide a technical effect of utilizing Class No-Dividend common stock shares wherein an amount of money that the company would normally set aside to pay dividends to Class No-Dividend common stock shares is instead used to buy back other Class No-Dividend common stock shares. Accordingly, the Class No-Dividend common stock shares enhance returns for long-term investors by reducing transaction costs and eliminating the need for the investors to reinvest dividend proceeds at inopportune times.

Referring to FIG. 7, a method for determining the adjusted Class No-Dividend common stock share multiplier value when stock splits or reverse splits occur.

At step 110, the client computer 24, determines the updated number of Class A common stock shares and updated number of Class No-Dividend common stock shares.

At step 112, the client computer 24 determines the updated Class No-Dividend common stock share multiplier value by using the following equation: Updated Class No. Dividend common stock share multiplier value=(Updated number of Class A common stock shares/block size percentage of the Class A common stock shares)/(Updated number of Class No-Dividend common stock shares/block size of percentage of the Class No-Dividend common stock shares)

Exemplary calculations utilizing the methodology of FIG. 7 will now be explained. Continuing with the assumptions in the previous example, assume that management desires to split each and every Class No-Dividend common stock share into 2 shares while at the same time splitting each and every Class A common stock share into 4 shares, ceteris paribus. Therefore, the number of Class No-Dividend common stock shares increases from 100 to 200 and the number of Class A common stock shares increases from 200 to 800. Using the same formula described in the previous paragraph, the updated Class No-Dividend common stock multiplier value would be =(800/75%)/(200/25%)=1.333.

Figure 8:
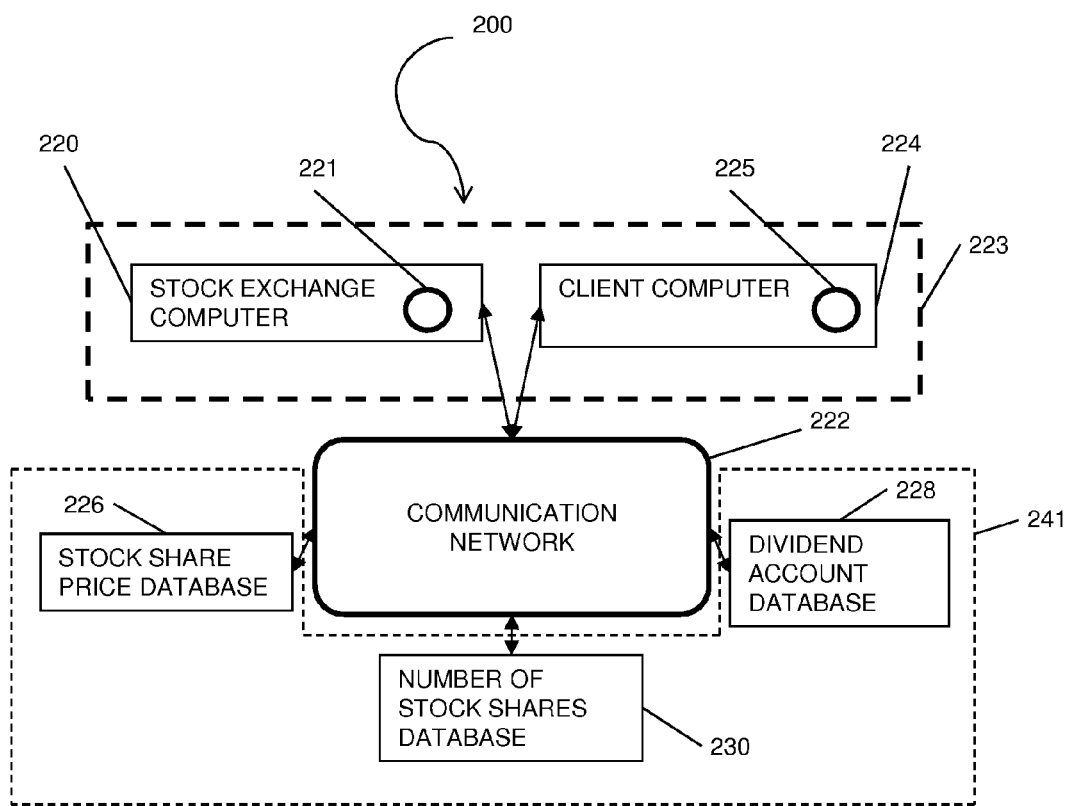
FIG. 8 is a schematic of a system that maintains control over a first plurality of stock shares in a first stock share class, a second plurality of stock shares in a sub-class of the first stock share class in single-sub-class scenario; the second plurality of stock shares in both the sub-class of the first stock share class and a sub-class of a second stock share class in a dual-sub-class scenario and a third plurality of stock shares in the second stock share class; along with dividends attributable to each class of stock shares in accordance with another exemplary embodiment.

Referring to FIG. 8, a system 200 for allocating dividends to a block of stock shares is provided. The system 200 includes a stock exchange computer 220, a memory device 221, a communication network 222, a client computer 224, a memory device 225, a common stock share price database 226, a dividend account database 228, and a number of stock shares database 230. The common stock share price database 226, the dividend account database 228, and the number of stock shares database 230 comprise data stored in a memory device of a computer 241. Of course, in an alternative embodiment, the databases 226, 228, 230 could be stored in memory devices in one or more computers. Also, in an alternative embodiment, the stock exchange computer 220 and client computer 224 could comprise a single computer 223.

Before describing the system 200 in greater detail, several terms utilized herein will be defined for purposes of understanding.

The term "sub-class" or "single-sub-class" means a class of stock shares that has at least one characteristic that is determined based on at least one characteristic of another stock share class (i.e., a parent class of stock shares) and a multiplier value, wherein the multiplier value is adjusted over time. In one exemplary embodiment, at least one characteristic of the class of stock shares is determined based on multiplying at least one characteristic of the another stock share class (i.e., the parent class of stock shares) by the multiplier value, wherein the multiplier value is adjusted over time.

The term "dual-sub-class" means a class of stock shares that have at least one characteristic determined based on: at least one characteristic of a first stock share class and a first multiplier value, and at least one characteristic of a second stock share class and a second multiplier value, wherein the first and second multiplier values are adjusted over time.

The term "first plurality of stock shares" means a plurality of stock shares in a first stock share class.

The term "second plurality of stock shares" means a plurality of stock shares in a sub-class of a first stock share class in a single-sub-class scenario. Alternately, the term "second plurality of stock shares" means a plurality of stock shares in both a sub-class of the first stock share class and a sub-class of a second stock share class in a dual-sub-class scenario.

The term "third plurality of stock shares" means a plurality of stock shares in a second stock share class.

The term "first percentage of the total dividend amount" means a percentage multiplied by the total dividend amount. For example, if a percentage is 25% and the total dividend amount is $100 million, a first percentage of the total dividend amount is $25 million.

The term "second percentage of the total dividend amount" means a percentage multiplied by the total dividend amount.

The term "third percentage of the total dividend amount" means a percentage multiplied by the total dividend amount.

The term "voting policy" means an amount of voting rights entitled to a stock share in a stock share class or a stock share in a sub-class of stock shares. For example, in one exemplary embodiment, a first voting policy relating to a sub-class of a first stock share class is configured to change over time based on a difference between a dividend amount paid to each stock share of the first plurality of stock shares in the first stock share class and a dividend amount paid to each stock share of a second plurality of stock shares in the sub-class of the first stock share class.

For example, if each stock share in the sub-class of the first stock share class is paid a smaller dividend than each stock share in the first stock share class, then the voting rights of each stock share in the sub-class of the first stock share class increases as a function of the difference of the dividend payments, ceteris paribus. In other words, for example, if each stock share in the first stock share class pays a 3% dividend and each stock share in the sub-class of the first stock share class pays a 1% dividend, then the voting rights associated with each stock share in the sub-class of the first stock share class will increase by about 2% relative to the voting rights associated with each stock share in the first stock share class based on the following equation which is consistent with FIG. 13:

$$= 3\%/(1-3\%) - 1\%/(1-3\%) = 2\%$$

A general overview of a methodology utilized by the system 200 will now be explained. In particular, the methodology is designed to satisfy multiple groups of investors, those who prefer to receive dividends based on current dividend practices and those who prefer to own customized dividend investment vehicles. Furthermore, the methodology is designed to help companies appeal to a broader investor base by providing customized dividend payment streams.

The system 200 utilizes a new sub-class of stock shares that is a sub-class of a class of stock shares. A sub-class of stock shares refers to a class of stock shares that has the characteristics of another class of stock shares (i.e, parent class of stock shares) except that the sub-class of stock shares has a dividend policy different than a dividend policy of the other class of stock shares (i.e., parent class of stock shares), in a specific currency. For example, referring to FIG. 20, a first plurality of stock shares 250 is in a class A and therefore correspond to class A stock shares, and a second plurality of stock shares 252 is in a sub-class A. Thus, FIG. 20 illustrates a single sub-class scenario wherein only one sub-class of stock shares exists relating to a respective parent class of stock shares 250.

The system 200 also utilizes a dual-sub-class of stocks shares. The term "dual-sub-class" means a class of stock shares that have the characteristics of two respective classes of stock shares (i.e., two parent classes of stock shares) except that the dual-sub-class of stock shares has a dividend policy different than a dividend policy of at least one of the two classes of stock shares, in a specific currency. For example, referring to FIG. 21, a first plurality of stock shares 250 is in a class A and therefore correspond to class A stock shares; and a third plurality of stock shares 260 is in a class C and therefore correspond to class C stock shares; and a second plurality of stock shares 262 is in both sub-class C and sub-class A (e.g., dual-sub-classes). Thus, FIG. 21 illustrates a dual-sub-class scenario.

The methodology discussed herein is intended for companies that plan to continue paying dividends to the owners of the first plurality of stock shares 250. The methodology is also intended for companies that plan to continue paying dividends to the owners of the third plurality of stock shares 260. Also, the methodology is intended for companies that want additional flexibility in how to manage future dividend payments. Any funds allocated to dividend payments that are not allocated to the accounts of stock shareholders can be used to repurchase stock shares. This methodology therefore concentrates value in the stock shares that receive a proportionally smaller dividend payment by the differential amount in dividend payments. Furthermore, this methodology can concentrate value in the stock shares that received a proportionally smaller dividend payment by increasing its value relative to other classes or sub-classes. As a general rule, the higher the per share dividend, the higher the marketplace will value a stock share, ceteris paribus. With the implementation of the concepts in this application, this general rule will no longer be valid; and the inverse of this general rule would hold true. Furthermore, the second plurality of stock shares 252 in the sub-class of the first stock share class in the single-sub-class scenario and the second plurality of stock shares 262 in both the sub-class of the first stock share class and the sub-class of the second stock share class in the dual-sub-class scenario can be implemented either together or separately.

In the single sub-class scenario or the dual-sub-class scenario, the second plurality of stock shares 252, 262, respectively, may enhance returns for long-term investors by allowing investors to avoid reinvesting at inopportune times. Further, depending upon how the second plurality of stock shares 252, 262 is structured, the stocks shares 252, 262 can more accurately reflect the true financial performance of the company because it can capture the total return to shareholders over time as compared to the first plurality of stock shares 250 or the third plurality of stock shares 260. Further, depending upon how the second plurality of stock shares 252, 262 are structured, the stock shares 252, 262 can provide changing levels of cash flows that may be desirable to investors. Therefore, the second plurality of stock shares 252, 262 could provide a relatively high cash flow element typically associated with fixed income, but with expected total returns associated with equity. Furthermore, depending upon how the second plurality of stock shares 252, 262 are structured, the stock shares 252, 262 can capture the value of multiple classes of stock shares already in existence but trade in the marketplace as a unique investment instrument.

Figure 21:
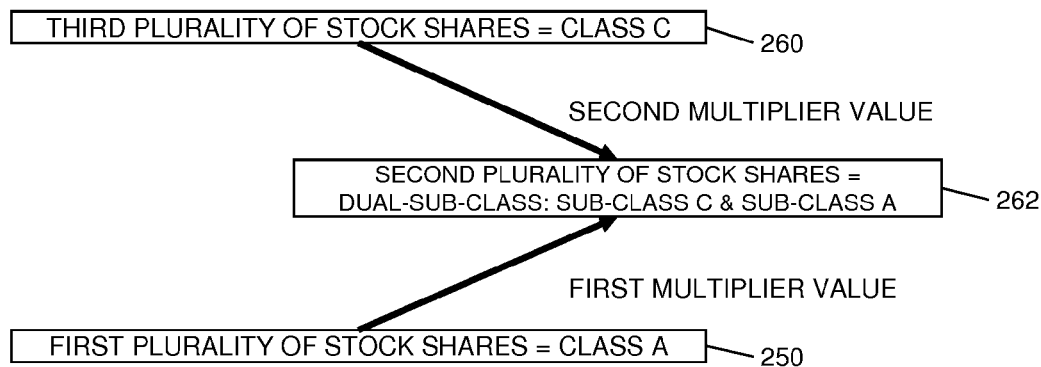
FIG. 21 is a block diagram showing a second plurality of stock shares in both a sub-class of the first stock share class and a sub-class of the second stock share class in a dual-sub-class scenario relative to a first plurality of stock shares in a first stock share class and a third plurality of stock shares in the second stock share class via first and second multiplier values, respectively.

Referring to FIGS. 8, 20 and 21, the stock exchange computer 220 is configured to communicate with the client computer 224; and the database computer 241 storing the databases 226, 230, 228 therein; utilizing the communication network 222. The stock exchange computer 220 is configured to perform requests to buy, sell, offer a stock dividend, stock split, or reverse stock split of the first plurality of stock shares 250 (shown in FIGS. 20 and 21), the second plurality of stock shares 252, 262 (shown in FIGS. 20 and 21), and the third plurality of stock shares 260 (shown in FIG. 21), in response to requests from the client computer 224. The stock exchange computer 220 is further configured to be able to convert a certain number or percentage of the first plurality of stock shares 250 and third plurality of stock shares 260 into the second plurality of stock shares 262, as directed from the client computer 224 using the information in the number of stock shares database 230. The stock exchange computer 220 is further configured to be able to issue a certain number of the second plurality of stock shares 262 to owners of existing first plurality of stock shares 250 and the third plurality of stock shares 260 in accordance with command messages from the client computer 224 using the information in the number of stock shares database 230. The stock exchange computer 220 is further configured to retrieve trading prices of the first plurality of stock shares 250, the second plurality of stock shares 262, and the third plurality of stock shares 260 from the stock share price database 226. As shown, the stock exchange computer 220 is operably coupled to a communication network 222. The communication network 222 is further operably coupled to the client computer 224; and the stock share price database 226, the dividend account database 228, and the number of stock shares database 230 stored in the memory device in the database computer 241.

The client computer 224 is configured to allocate dividends to the accounts of owners of the first plurality of stock shares 250, the second plurality of stock shares 252, 262, and the third plurality of stock shares 260 using the dividend account database 228. The client computer 224 is configured to send command messages to the stock exchange computer 220 to buy or sell the first plurality of stock shares 250, the second plurality of stock shares 252, 262, and the third plurality of stock shares 260 of the company. The memory device 221 is configured to store information generated by the stock exchange computer 220. The client computer 224 is further configured to store data indicating dividend amounts in dividend accounts of stock share owners stored in the dividend account database 228. The client computer 224 is further configured to store data indicating the number of the first plurality of stock shares 250, the second plurality of stock shares, and the third plurality of stock shares 260 in the database 230. The memory device 225 is configured to store information generated by the client computer 224. The client computer 224 is further configured to perform additional calculations as will be described in greater detail below and to store determined values in an internal memory device. The client computer 224 is further configured to retrieve trading prices of the first plurality of stock shares 250, the second plurality of stock shares 252, 262, and the third plurality of stock shares 260 from the stock share price database 226 to perform calculations.

Figure 9:
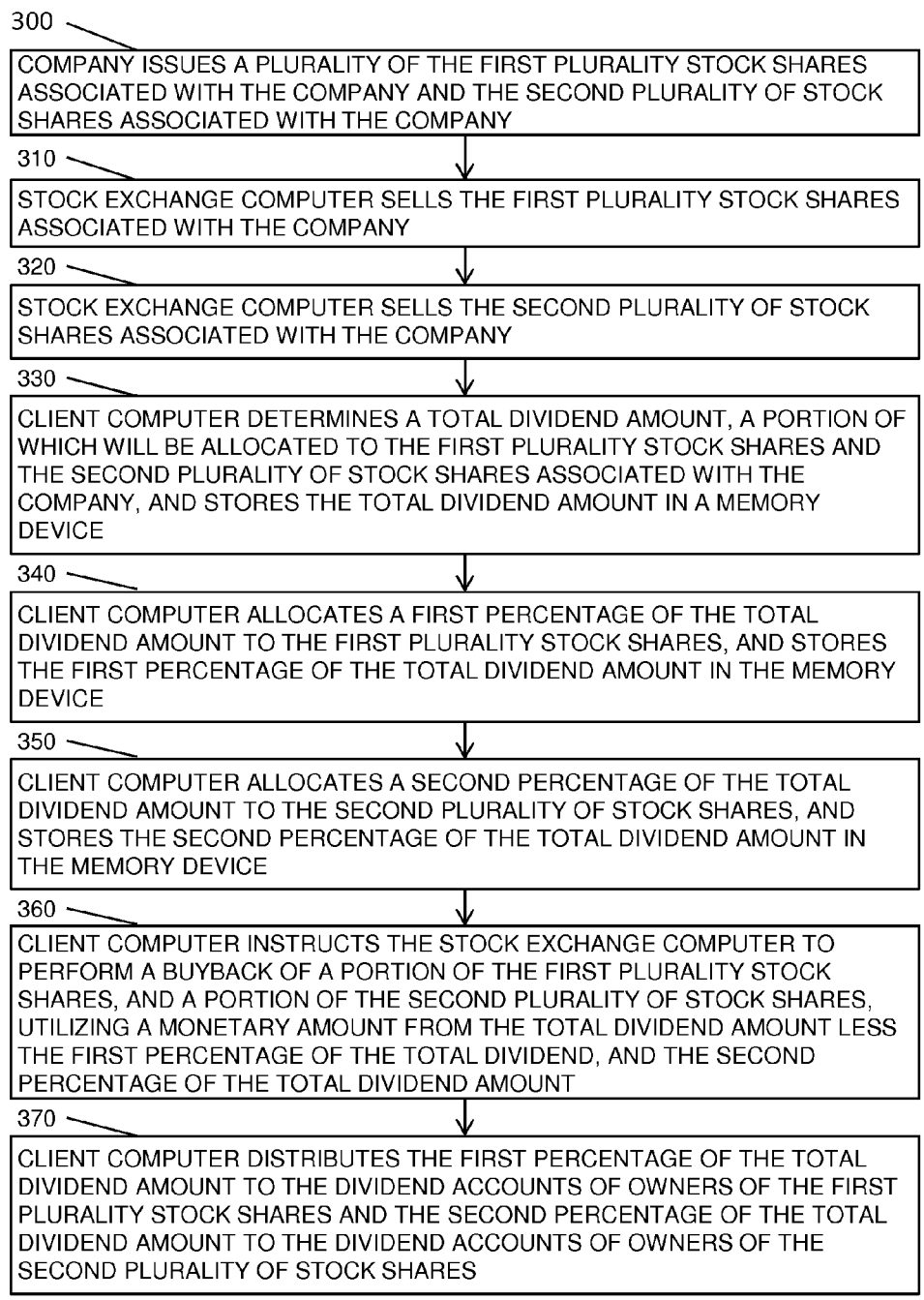
FIG. 9 is a flowchart of a method for allocating dividends to a first plurality of stock shares in a first stock share class, and a second plurality of stock shares in a sub-class of the first stock share class in a single-sub-class scenario in accordance with another exemplary embodiment.

Referring to FIGS. 9 and 20, a flowchart of a method for allocating dividends to stock shares in a single sub-class scenario in accordance with another exemplary embodiment will now be explained. The method can be implemented utilizing the system 200 described above.

At step 300, a company issues a plurality of the first plurality of stock shares 250 associated with the company and the second plurality of stock shares 252 associated with the company. If the company previously issued the first plurality of stock shares 250, then the company may choose not to issue any additional first plurality of stock shares 250 and the stock exchange computer 220 can be configured to be flexible in this manner.

At step 310, based on a message from the client computer 224, the stock exchange computer 220 sells the first plurality of stock shares 250 associated with the company.

At step 320, based on a message from the client computer 224, the stock exchange computer 220 sells the second plurality of stock shares 252 associated with the company.

At step 330, the client computer 224 determines a total dividend amount, a portion of which will be allocated to the first plurality stock shares 250 and the second plurality of stock shares 252 associated with the company, and stores the total dividend amount in a memory device 225, and/or in the dividend account database 228 via the communication network 222 and the database computer 241.

At step 340, the client computer 224 allocates a first percentage of the total dividend amount to the first plurality stock shares 250, and stores the first percentage of the total dividend amount in the memory device 225 and/or the dividend account database 228.

At step 350, the client computer 224 allocates a second percentage of the total dividend amount to the second plurality of stock shares 252, and stores the second percentage of the total dividend amount in the memory device 225 and/or the dividend account database 228.

At step 360, the client computer 224 sends a message that instructs the stock exchange computer 220 to perform a share buyback of a portion of the first plurality of stock shares 250, and a portion of the second plurality of stock shares 252, utilizing a monetary amount from the total dividend amount less the first percentage of the total dividend amount and the second percentage of the total dividend amount.

At step 370, the client computer 224 distributes the first percentage of the total dividend amount to dividend accounts of owners of the first plurality of stock shares 250 and the second percentage of the total dividend amount to the dividend accounts of owners of the second plurality of stock shares 252.

Figure 11:
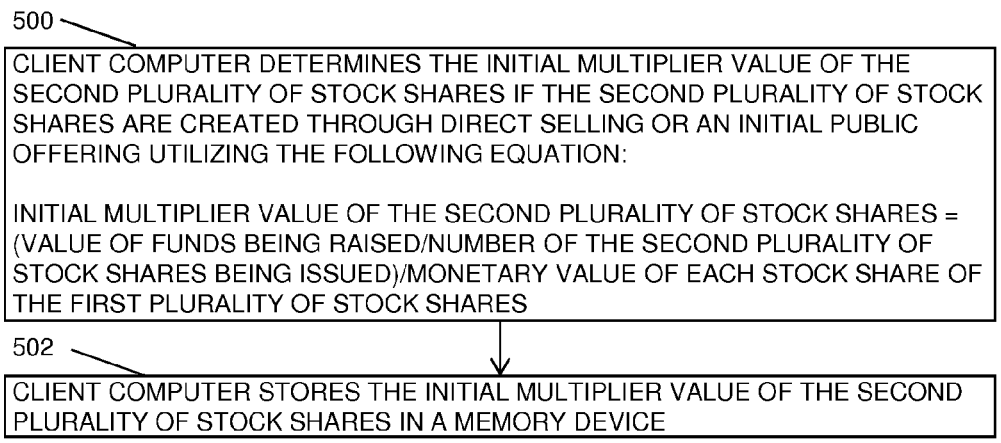
FIG. 11 is a flowchart of a method for determining an initial second plurality of stock shares in a sub-class of a first stock share class multiplier value in a single-sub-class scenario as a result of selling or an initial public offering.

Referring to FIGS. 11 and 20, a flowchart of a method for determining the initial multiplier value of the second plurality of stock shares 252 in the single-sub-class will now be explained. The purpose of the initial multiplier value is to establish the starting relationship between first plurality of stock shares and the second plurality of stock shares. For example, an initial multiplier value of 1.5000 would mean that each stock share of the second plurality of stock shares is equal to 1.5000 stock shares of the first plurality of stock shares. Therefore, if each stock share of the first plurality of stock shares had one vote, then each stock share of the second plurality of stock shares would have 1.5000 votes.

At step 500, the client computer 224 determines an initial multiplier value of the second plurality of stock shares 252 if the stock shares 252 are being created through direct selling or an initial public offering utilizing the following equation: Initial multiplier value of the second plurality of stock shares 252=(Value of funds being raised/Number of the second plurality of stock shares 252 being issued)/Monetary value of each stock share of the first plurality of stock shares 250.

At step 502, the client computer 224 stores the initial multiplier value of the second plurality of stock shares 252 in the memory device 225 and/or dividend account database 228.

Exemplary calculations utilizing the methodology of FIG. 11 will now be explained. Assume that a company has outstanding class A common stock shares corresponding to the first plurality of stock shares 250 that have a value of $100 per stock share. Also assume that the company will raise $45,000,000 through the sale of sub-class stock shares corresponding to the second plurality of stock shares 252. The company plans to create 300,000 sub-class stock shares in the offering. Based on this information, the initial sub-class multiplier value would be 1.50.

$$= (45,000,000 / 300,000) / \$100 = 1.50$$

Figure 12:
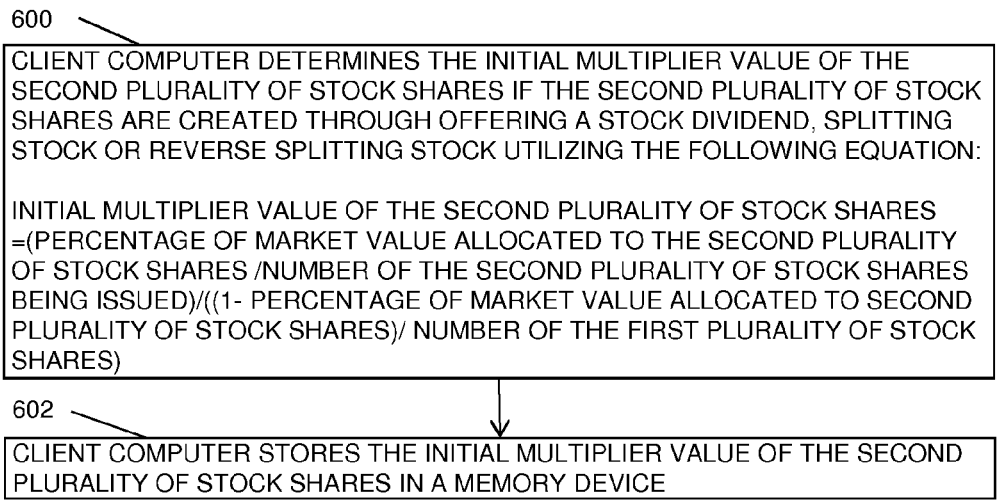
FIG. 12 is a flowchart of a method for determining an initial second plurality of stock shares in a sub-class of a first stock share class multiplier value in a single-sub-class scenario as a result of issuing a stock dividend, splitting stock or reverse splitting stock.

Referring to FIGS. 12 and 20, a flowchart of another method for determining the initial multiplier value of the second plurality of stock shares 252 in the single-sub-class will now be explained.

At step 600, the client computer 224 determines an initial multiplier value of the second plurality of stock shares 252 if the stock shares 252 are being created through offering a stock dividend, stock splitting or stock reverse splitting, utilizing the following equation: Initial multiplier value of the second plurality of stock shares 252=(Percentage of market value allocated to the second plurality of stock shares 252/Number of the second plurality of stock shares 252 being issued)/((1−Percentage of market value allocated to second plurality of stock shares 252)/Number of the first plurality of stock shares 250).

At step 602, the client computer 224 stores the initial multiplier value of the second plurality of stock shares 252 in the memory device 225 and/or dividend account database 228.

Exemplary calculations utilizing the methodology of FIG. 12 will now be explained. Assume that a company will either offer a stock dividend, split class A common stock shares corresponding to the first plurality of stock shares 250 or reverse split class A common stock shares such that the number of outstanding class A common stock shares is 400,000 after the event. Also assume that the company expects the combined market value of the class A common stock shares, and sub-class common stock shares corresponding to the second plurality of stock shares 252 to be $100,000,000 after the transaction, with sub-class common stock shares comprising $10,000,000, or 10%, of the $100,000,000. The company also plans to create 100,000 sub-class common stock shares in the offering. Based on this information, the initial sub-class multiplier value would be 0.44.

$$= (10\% / 100,000) / ((1 - 10\%) / 400,000) = 0.44$$

Figure 13:
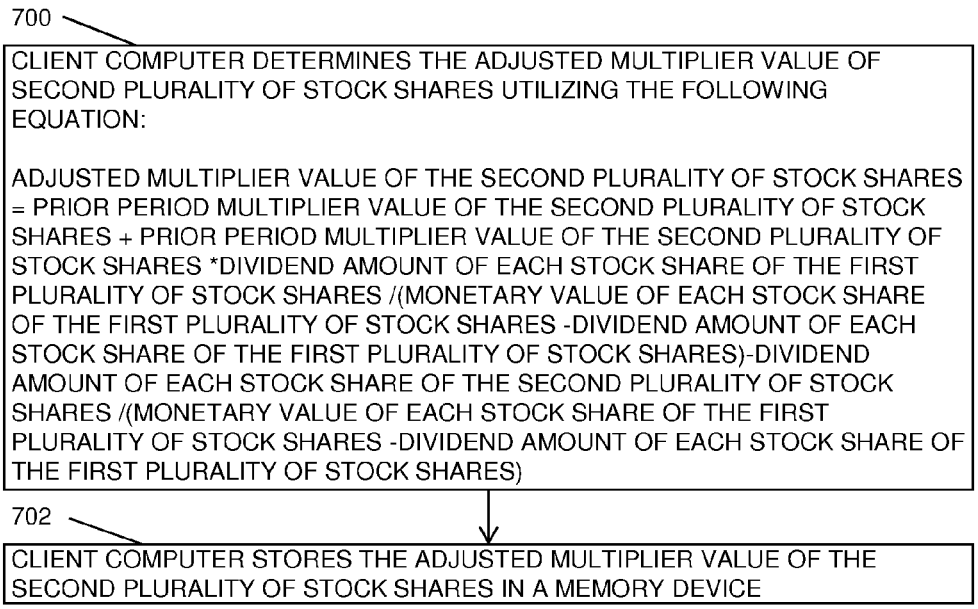
FIG. 13 is a flowchart of a method for determining the adjusted multiplier value for a second plurality of stock shares in a sub-class of the first stock share class in a single-sub-class scenario in accordance with another exemplary embodiment.

Referring to FIGS. 13 and 20, a flowchart of a method for determining the adjusted multiplier value of the second plurality of stock shares 252 in the single-sub-class will now be explained. The purpose of the adjusted multiplier value is to update the relationship between a first plurality of stock shares and the second plurality of stock shares based on the dividend amounts paid to the shareholders of each stock share of the first plurality of stock shares and second plurality of stock shares. For example, if a 2% dividend is paid to the first plurality of stock shares and none is paid to the second plurality of stock shares, then the adjusted multiplier value would increase as a function of the 2% dividend payment.

At step 700, the client computer 224 determines an adjusted multiplier value of the second plurality of stock shares 252 utilizing the following equation: Adjusted multiplier value of the second plurality of stock shares 252=Prior period multiplier value of the second plurality of stock shares 252+Prior period multiplier value of the second plurality of stock shares 252*Dividend amount of each stock share of the first plurality of stock shares 250/(Monetary value of each stock share of the first plurality of stock shares 250−Dividend amount of each stock share of the first plurality of stock shares 250)−Dividend amount of each stock share of the second plurality of stock shares 252/(Monetary value of each stock share of the first plurality of stock shares 250−Dividend amount of each stock share of the first plurality of stock shares 250).

At step 700, the client computer 224 stores the initial multiplier value of the second plurality of stock shares 252 in the memory device 225 and/or dividend account database 228.

Exemplary calculations utilizing the methodology of FIG. 13 will now be explained. Assume that when a company had issued sub-class common stock shares corresponding to the second plurality of stock shares 252, the company did so with the intention of paying a $5 per stock share dividend at some point in time, which will be assumed to be in the current period. Also assume that the current sub-class multiplier value is 1.579. Now assume that the company is paying a $3 per class A common stock share dividend corresponding to the first plurality of stock shares 250, and the class A common stock share has a current value of $100. Based on this information, the adjusted sub-class multiplier value would be 1.576.

$$= 1.579 + 1.579 * 3 / (100 - 3) - 5 / (100 - 3) = 1.576$$

Referring to FIG. 20, a block diagram showing the second plurality of stock shares as the single-sub-class relative to the first plurality of stock shares 250.

Exemplary illustration will now be used to show a practical application of the second plurality of stock shares 252. In this illustration, the first plurality of stock shares 250 will be shown as class A common stock shares; the aforementioned methods will be used. Also in this illustration, the second plurality of stock shares 252 will be shown as sub-class common stock shares in a single-sub-class scenario. Simplified assumptions will be used for illustrative purposes. Assume that the company has historically paid a 3% dividend yield, which is expected to continue. The current value of class A common stock shares is $25 per share and the expected value of the class A common stock shares, based on historical trends, would be $100 in 15 years (simply 9.7% compounded over 15 periods, excluding dividend returns). Further, assume that a company is interested in creating an investment tool that would appeal to investors in a demographic group who have not saved sufficiently for retirement. Further, assume that this demographic group has an average age of 50-years old, and is planning to retire when they are 65-years old—15 years into the future. The company could create the sub-class common stock shares corresponding to the second plurality of stock shares 252 that are initially equivalent to class A common stock shares (initial multiplier value of 1.0000), pays zero dividends for the following 15 years, then pays a $5 per share dividend starting in year 16 and every year thereafter. From the investor's perspective, purchasing a $25 sub-class common stock share today will yield a 20% expected return ($5/$25) when they retire after 15 year.

Continuing with this illustration, during the 15-year time period, if foregone dividends were, in fact, 3% annually, the multiplier value would increase from 1.0000 to 1.5792=((1/(1−3%))^15), which is a simplified version of the method described in FIG. 13. If class A common stock shares had a value of $100 per share at the end of year 15, then sub-class common stock shares would likely have a value of $157.92= ($100*1.5792). Therefore, the commitment of a $5 per share dividend to sub-class shareholders result is a 3.16% dividend yield ($5/$157.92), which is easily afforded by the company based on current dividend policy. Moreover, because the sub-class shareholders did not receive dividends during the 15-year period, the value of the foregone dividends have effectively been reinvested back into the company without any cost to investors, so the net benefit is not simply a matter of moving cash flows from one period to the next. This results in a benefit to a shareholder that does not currently exist in the marketplace. From the company's perspective, although the company indicated that it would pay a $5 dividend at a point in the future in good faith, if the company was unable to do so, the company would not be in default as it is not obligated to pay dividends until declared. To the extent that the company used the dividends that were not paid to the sub-class common stock shares over the first 15-year period to repurchase sub-class common stock shares, the company could reduce its expected total dividend payments associated with the new sub-class of stock shares by the end of year 15. Moreover, the company could have used those funds to repurchase any class or sub-class of stock shares to augment the company's capital structure as desired. Further, if the multiplier value is anything other 1.0000, then the voting policy of the class A common stock shares will be different from the voting policy of the sub-class common stock shares. In this example, with a multiplier value of 1.5792, the voting policies would differ as a function of the multiplier value; the shareholder of each sub-class common stock share would entitled to 1.5792 votes while the shareholder of each class A common stock share would be entitled to 1.0000 vote. As the multiplier value changes over time, so too does the voting policy associated with the sub-class common stock shares.

Figure 10:
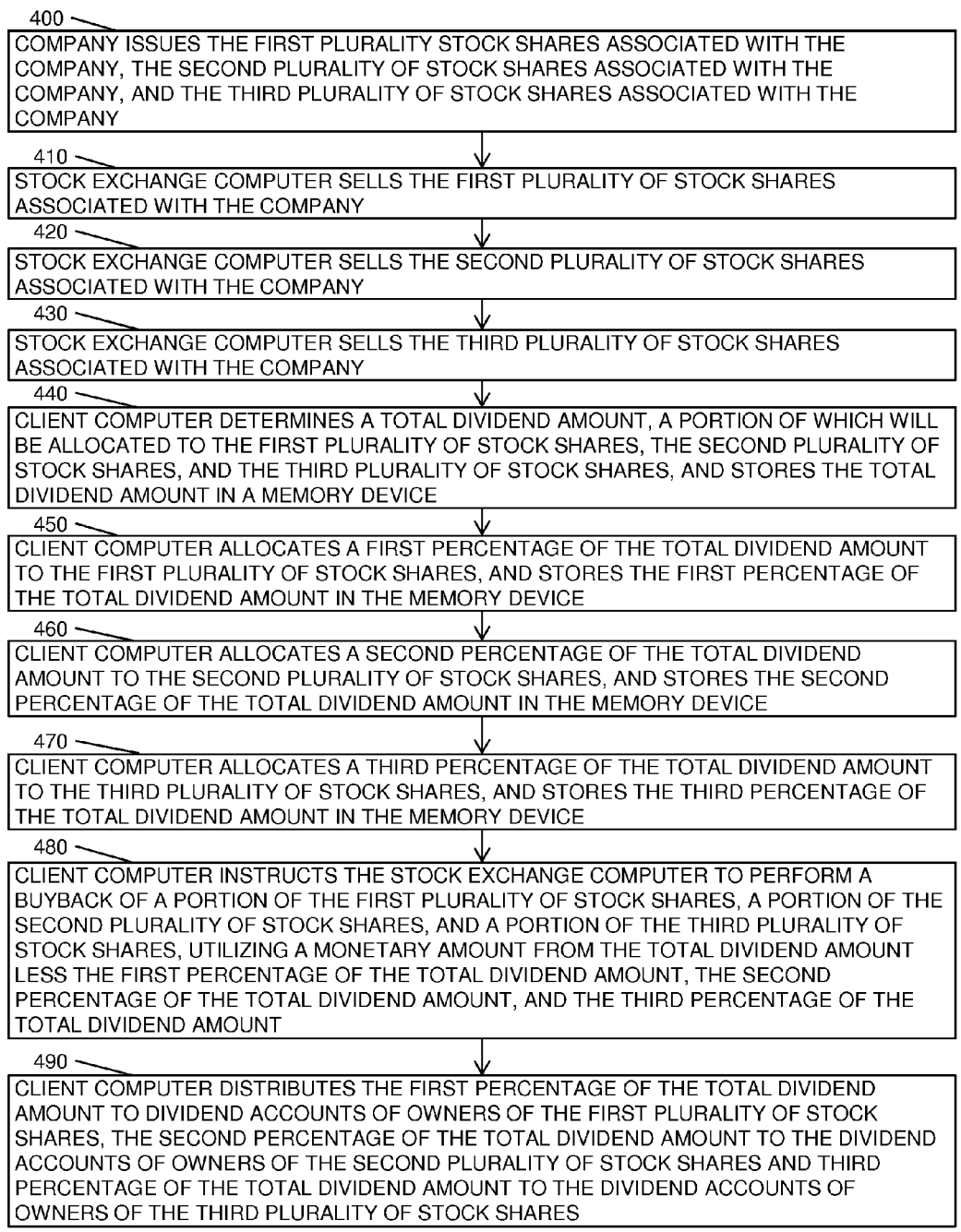
FIG. 10 is a flowchart of a method for allocating dividends to a first plurality of stock shares in the first stock share class, a second plurality of stock shares in both a sub-class of the first stock share class and a sub-class of a second stock share class in a dual-sub-class scenario and a third plurality of stock shares in the second stock share class in the dual-sub-class scenario in accordance with another exemplary embodiment.

Referring to FIGS. 10 and 21, a flowchart of a method for allocating dividends to stock shares in a dual-sub-class scenario in accordance with another exemplary embodiment will now be explained. The method can be implemented utilizing the system 200 described above.

At step 400, a company issues a first plurality of stock shares 250 associated with the company, a second plurality of stock shares 262 associated with the company, and a third plurality of stock shares 260 associated with the company. Alternately, if the company previously issued the first plurality of stock shares 250 and the third plurality of stock shares 260 then the company may choose not to issue any additional first plurality of stock shares 250 and third plurality of stock shares 260 and the stock exchange computer 220 can be configured to be flexible in this manner.

At step 410, based on a message from the client computer 224, the stock exchange computer 220 sells the first plurality of stock shares 250 associated with the company.

At step 420, based on a message from the client computer 224, the stock exchange computer 220 sells the second plurality of stock shares 262 associated with the company.

At step 430, based on a message from the client computer 224, the stock exchange computer 220 sells the third plurality of stock shares 260 associated with the company.

At step 440, the client computer 224 determines a total dividend amount, a portion of which will be allocated to the first plurality of stock shares 250, the second plurality of stock shares 262, and the third plurality of stock shares 260, and stores the total dividend amount in the memory device 225 and/or the dividend account database 228.

At step 450, the client computer 224 allocates a first percentage of the total dividend amount to the first plurality of stock shares 250, and stores the first percentage of the total dividend amount in the memory device 225 and/or the dividend account database 228.

At step 460, the client computer 224 allocates a second percentage of the total dividend amount to the second plurality of stock shares 262, and stores the second percentage of the total dividend amount in the memory device 225 and/or the dividend account database 228.

At step 470, the client computer 224 allocates a third percentage of the total dividend amount to the third plurality of stock shares 260, and stores the third percentage of the total dividend amount in the memory device 225 and/or the dividend account database 228.

At step 480, the client computer 224 sends a message that instructs the stock exchange computer 220 to perform a share buyback of a portion of the first plurality of stock shares 250, a portion of the second plurality of stock shares 262, and a portion of the third plurality of stock shares 260, utilizing a monetary amount from the total dividend amount less the first percentage of the total dividend amount, the second percentage of the total dividend amount, and the third percentage of the total dividend amount.

At step 490, the client computer 224 distributes the first percentage of the total dividend amount to dividend accounts of owners of the first plurality of stock shares 250, the second percentage of the total dividend amount to the dividend accounts of owners of the second plurality of stock shares 262 and the third percentage of the total dividend amount to the dividend accounts of owners of the third plurality of stock shares 260 utilizing the dividend account database 228.

Figure 14:
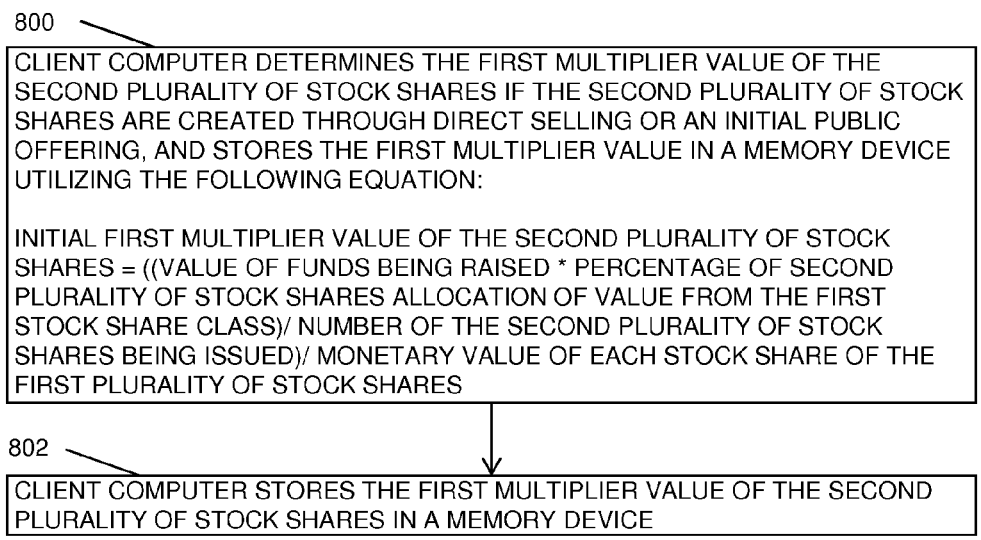
FIG. 14 is a flowchart of a method for determining a first multiplier value for a second plurality of stock shares in both a sub-class of a first stock share class and a sub-class of the second stock share class in a dual-sub-class scenario as a result of selling or an initial public offering in accordance with another exemplary embodiment.

Referring to FIGS. 14 and 21, a flowchart of a method for determining the initial first multiplier value of the second plurality of stock shares 262 in the dual-sub-class will now be explained. The purpose of the initial first multiplier value is to establish the starting relationship between first plurality of stock shares and the second plurality of stock shares. Furthermore, the initial first multiplier value in a dual-sub-class scenario describes the first of two relationships that the second plurality of stock shares has. For example, an initial multiplier value of 1.5000 would mean that each share of the second plurality of stock shares is equal to 1.5000 stock shares of the first plurality of stock shares. Therefore, if each stock share of the first plurality of stock shares had one vote, then each stock share of the second plurality of stock shares would have 1.5000 votes. The second plurality of stock shares may also be entitled to additional votes, but this would be a function of the initial second multiplier value described later in this application.

At step 800, the client computer 224 determines the initial first multiplier value of the second plurality of stock shares 262 if the stock shares 262 are being created through direct selling or an initial public offering utilizing the following equation: Initial first multiplier value of the second plurality of stock shares 262=((Value of funds being raised*Percentage of second plurality of stock shares allocation of value from the first stock share class)/Number of the second plurality of stock shares 262 being issued)/Monetary value of each stock share of the first plurality of stock shares 250. The "Percentage of second plurality of stock shares allocation of value from the first stock share class" is intended to separate the funds being raised into two portions in a dual-sub-class scenario. The first portion is required to determine the initial first multiplier value and the second portion is required to determine the initial second multiplier value. If the company arbitrarily determines that the first portion should be small, this will make the initial first multiplier value small and the initial second multiplier large, ceteris paribus. In contrast, if the company determines that the first portion to be relatively larger, this will make the initial first multiplier value relatively larger and the initial second multiplier relatively smaller, ceteris paribus.

At step 802, the client computer 224 stores the initial first multiplier value of the second plurality of stock shares 262 in the memory device 225 and/or dividend account database 228.

Exemplary calculations utilizing the methodology of FIG. 14 will now be explained. In this example, the first stock share class will be shown as the class A common stock shares corresponding to the first plurality of stock shares 250, and the second stock share class will be shown as the class C stock shares corresponding to the third plurality of stock shares 260. Assume that a company has outstanding class C stock shares that have a value of $100 per share. Assume that the company has class A common stock shares that have a value of $75 per share. Also assume that the company will raise $60,000,000 through the issuance of sub-class stock shares corresponding to the second plurality of stock shares 262. The company plans to create 300,000 sub-class stock shares in the offering. Also assume that the company wants the sub-class to derive its value from class C stock shares and class A common stock shares on a 75% to 25% split, respectively. Based on this information, the initial first sub-class multiplier value would be 0.67.

$$= ((60,000,000 * 25\%)/300,000)/75 = 0.67$$

Figure 15:
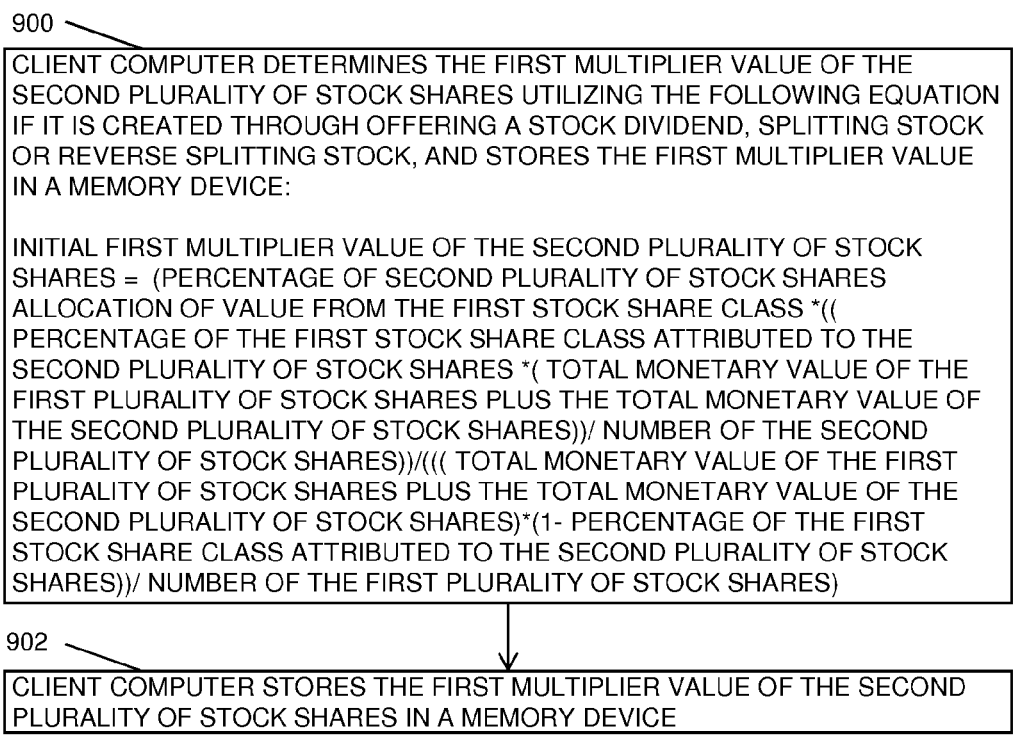
FIG. 15 is a flowchart of a method for determining a first multiplier value for a second plurality of stock shares in both a sub-class of the first stock share class and a sub-class of the second stock share class in a dual-sub-class scenario as a result of issuing a stock dividend, splitting stock or reverse splitting stock in accordance with another exemplary embodiment.

Referring to FIGS. 15 and 21, a flowchart of a method for determining the initial first multiplier value of the second plurality of stock shares 262 in the dual-sub-class will now be explained.

At step 900, the client computer 224 determines the initial first multiplier value of the second plurality of stock shares 262 if the stock shares 262 are being created through offering a stock dividend, stock splitting or stock reverse splitting utilizing the following equation: Initial first multiplier value of the second plurality of stock shares 262=(Percentage of second plurality of stock shares allocation of value from the first stock share class*((Percentage of the first stock share class attributed to the second plurality of stock shares 262* (Total monetary value of the first plurality of stock shares 250 plus the total monetary value of the second plurality of stock shares 262))/Number of the second plurality of stock shares 262))/(((Total monetary value of the first plurality of stock shares 250 plus the total monetary value of the second plurality of stock shares 262)*(1−Percentage of the first stock share class attributed to the second plurality of stock shares 262))/Number of the first plurality of stock shares 250).

At step 902, the client computer 224 stores the initial multiplier value of the second plurality of stock shares 252 in the memory device 225 and/or dividend account database 228.

Exemplary calculations utilizing the methodology of FIG. 15 will now be explained. In this example, the first stock share class will be shown as the class A common stock shares corresponding to the first plurality of stock shares 250, and the second stock share class will be shown as the class C stock shares corresponding to the third plurality of stock shares 260. Assume that a company will either offer a stock dividend, split class A common stock shares are reverse split class A common stock shares such that the number of outstanding class A common stock shares is 400,000 class A common stock shares after the event. The company also plans to create 100,000 sub-class stock shares corresponding to the second plurality of stock shares 262 in the offering. Assume that the company expects sub-class stock shares to initially trade for $100 per share. Also assume that the company expects the sum market value of the class A common stock shares and its sub-class stock shares of $100,000,000 ($90,000,000 to $10,000,000) to be split on a 90% to 10% ratio after the transaction. Further assume that the company wants the value of each sub-class stock share to initially derive its value from class C stock shares and class A common stock shares on a 75% to 25% ratio, respectively. Based on this information, the initial first multiplier value would be 0.11.

$$= (25\% * ((10\% * (90,000,000 + 10,000,000))/100,000))/$$
$$(((90,000,000 + 10,000,000) * (1 - 10\%))/400,000) = 0.11$$

Figure 16:
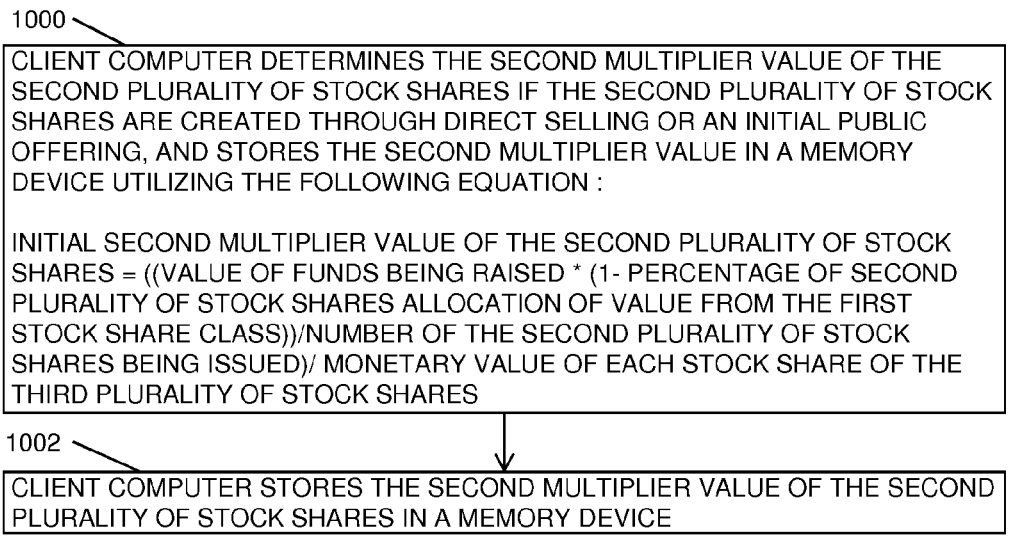
FIG. 16 is a flowchart of a method for determining a second multiplier value for a second plurality of stock shares in both a sub-class of a first stock share class and a sub-class of the second stock share class in a dual-sub-class scenario as a result of selling or an initial public offering in accordance with another exemplary embodiment.

Referring to FIGS. 16 and 21, a flowchart of a method for determining the initial second multiplier value of the second plurality of stock shares 262 in the dual-sub-class will now be explained. The purpose of the initial second multiplier value is to establish the starting relationship between third plurality of stock shares and the second plurality of stock shares. Furthermore, the initial second multiplier value in a dual-sub-class scenario describes the second of two relationships that the second plurality of stock shares has. For example, an initial multiplier value of 0.5000 would mean that each stock share of the second plurality of stock shares is equal to 0.5000 stock shares of the third plurality of stock shares. Therefore, if each stock share of the third plurality of stock shares had one vote, then each stock share of the second plurality of stock shares would have 0.5000 votes.

At step 1000, the client computer 224 determines the initial second multiplier value of the second plurality of stock shares 262 if the stock shares 262 are being created through direct selling or an initial public offering utilizing the following equation: Initial second multiplier value of the second plurality of stock shares 262=((Value of funds being raised*(1−Percentage of second plurality of stock shares allocation of value from the first stock share class))/Number of the second plurality of stock shares 262 being issued)/Monetary value of each stock share of the third plurality of stock shares 260.

At step 1002, the client computer 24 stores the initial multiplier value of the second plurality of stock shares 262 in the memory device 225 and/or dividend account database 228.

Exemplary calculations utilizing the methodology of FIG. 16 will now be explained. In this example, the first stock share class will be shown as the class A common stock shares corresponding to the first plurality of stock shares 250, and the second stock share class will be shown as the class C stock shares corresponding to the third plurality of stock shares 260. Assume that a company has outstanding class C stock shares that have a value of $100 per share. Assume that the company has class A common stock shares that have a value of $75 per share. Also assume that the company is planning to raise $60,000,000 through the issuance of sub-class shares corresponding to the second plurality of stock shares 262. The company plans to create 300,000 sub-class shares in the offering. Also assume that the company wants the sub-class to derive its value from class C stock shares and class A common stock shares on a 75% to 25% split, respectively. Based on this information, the initial second sub-class multiplier value would be 1.50.

$$= ((60,000,000 * (1 - 25\%))/300,000)/100 = 1.50$$

Figure 17:
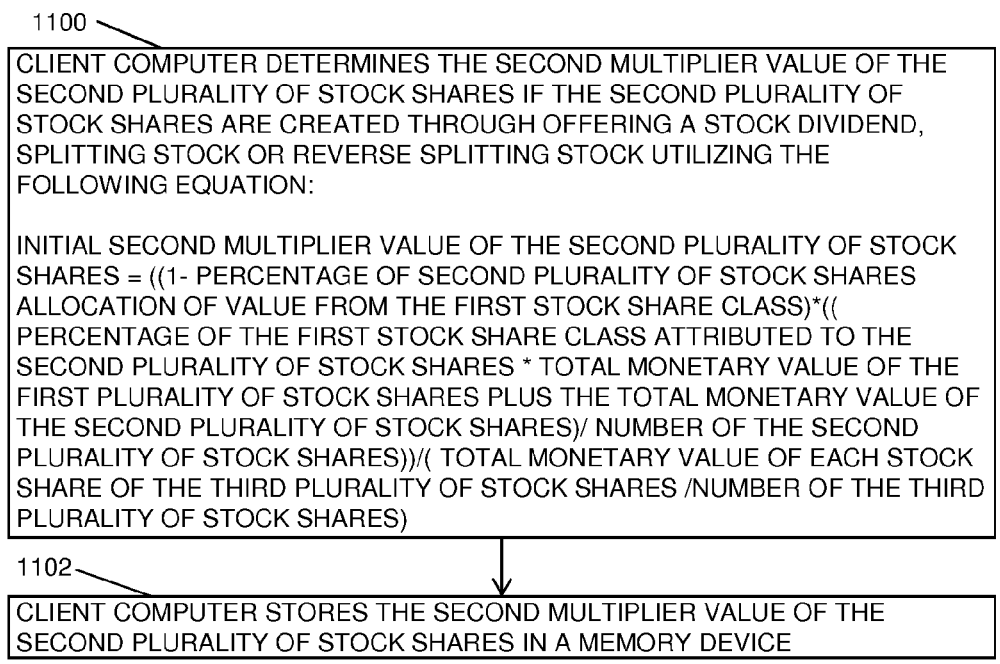
FIG. 17 is a flowchart of a method for determining a second multiplier value for a second plurality of stock shares in both a sub-class of a first stock share class and a sub-class of the second stock share class in a dual-sub-class scenario as a result of issuing a stock dividend, splitting stock or reverse splitting stock in accordance with another exemplary embodiment.

Referring to FIGS. 17 and 21, a flowchart of a method for determining the initial second multiplier value of the second plurality of stock shares 262 in the dual-sub-class will now be explained.

At step 1100, the client computer 224 determines the initial second multiplier value of the second plurality of stock shares 262 if the stock shares 262 are being created through offering a stock dividend, stock splitting or stock reverse splitting utilizing the following equation: Initial second multiplier value of the second plurality of stock shares 262=((1−Percentage of second plurality of stock shares allocation of value from the first stock share class)*((Percentage of the first stock share class attributed to the second plurality of stock shares 262*Total monetary value of the first plurality of stock shares 250 plus the total monetary value of the second plurality of stock shares 262)/Number of the second plurality of stock shares 262))/(Total monetary value of the third plurality of stock shares 260/Number of the third plurality of stock shares 260).

At step 1102, the client computer 224 stores the initial second multiplier value of the second plurality of stock shares 262 in the memory device 225 and/or dividend account database 228.

Exemplary calculations utilizing the methodology of FIG. 17 will now be explained. In this example, the first stock share class will be shown as the class A common stock shares corresponding to the first plurality of stock shares 250, and the second stock share class will be shown as the class C stock shares corresponding to the third plurality of stock shares 260. Assume that a company will either offer a stock dividend, split class A common stock shares are reverse split class A common stock shares such that the number of outstanding class A common stock shares is 400,000 shares after the event. The company also plans to create 100,000 sub-class stock shares corresponding to the second plurality of stock shares 262 in the offering. Assume that the company expects sub-class stock shares to initially have a value of $100 per share. Also assume that the company expects the sum market value of the class A common stock shares and sub-class stock shares of $100,000,000 ($90,000,000 to $10,000,000) to be split on a 90% to 10% ratio after the transaction. Further assume that the company wants the value of each sub-class share to initially derive its value from class C stock shares and class A common stock shares on a 75% to 25% ratio, respectively. Further, assume that the 350,000 class C stock shares have a value of $50,000,000 after the transaction. Based on this information, the initial second multiplier value would be 0.53.

$$= ((1 - 25\%) * ((10\% * (90,000,000 + 10,000,000))/100,000))/$$
$$(50,000,000/350,000) = 0.53$$

Referring to FIGS. 18 and 21, a flowchart of a method for determining the adjusted first multiplier value of the second plurality of stock shares 262 in the dual-sub-class will now be explained. The purpose of the adjusted first multiplier value is to update the relationship between a first plurality of stock shares and the second plurality of stock shares based on the dividend amounts paid to the shareholders of each stock share of the first plurality of stock shares, the second plurality of stock shares and the third plurality of stock shares. As dividends are paid to the stock shareholders of either the first plurality of stock shares, the second plurality of stock shares, or the third plurality of stock shares, the first multiplier value is subject to adjustments to ensure that value is not inappropriately transferred from one plurality of stock shares to the next.

At step 1200, the client computer 224 determines the adjusted first multiplier value of the second plurality of stock shares utilizing the following equation: Adjusted first multiplier value of the second plurality of stock shares 262=Prior period first multiplier value of the second plurality stock shares 262+((Prior period first multiplier value of the second plurality stock shares 262*(Dividend amount of each stock share of the first plurality of stock shares 250/(Monetary value of each stock share of each stock share of the first plurality of stock shares 250−Dividend amount of each stock share of the first plurality of stock shares 250)))*Percentage of the first plurality of stock shares dividend allocation affecting the first multiplier value)-(((Dividend amount of each stock share of the second plurality of stock shares 262*Percentage of the second plurality of stock shares dividend allocation affecting the first multiplier value)/(Monetary value of each stock share of the first plurality of stock shares 250−Dividend amount of each stock share of the first plurality of stock shares 250)))+(((Dividend amount of each stock share of the third plurality of stock shares 260*(1−Percentage of the third plurality of stock shares 260 dividend allocation affecting the second multiplier value))/(Monetary value of each stock share of the first plurality of stock shares 250−Dividend amount of each stock share of the first plurality of stock shares 250))*Prior period second multiplier value of the second plurality of stock shares 262).

At step 1202, the client computer stores the adjusted first multiplier value of the second plurality of stock shares 262 in the memory device 225 and/or dividend account database 228.

Exemplary calculations utilizing the methodology of FIG. 18 will now be explained. In this example, the first stock share class will be shown as the class A common stock shares corresponding to the first plurality of stock shares 250, and the second stock share class will be shown as the class C stock shares corresponding to the third plurality of stock shares 260. Assume that the company previously issued sub-class stock shares corresponding to the second plurality of stock shares 262 that derived value from its relationship with class C stock shares and class A common stock shares with prevailing multiplier values of 0.5000 and 1.0000, respectively. Assume the company communicated that 40% of any dividend paid to class A common stock shareholders will affect the first multiplier value of sub-class stock shares—it also can be inferred that the remaining 60% will affect the second multiplier value of sub-class stock shares. Further, assume the company communicated that 50% of any dividend paid to class C stock shareholders will affect the second multiplier value of sub-class stock shares—it also can be inferred that the remaining 50% will affect the first multiplier value of sub-class stock shares. Further, assume the company communicated that 30% of any dividends paid to sub-class shareholders will affect the first multiplier value of sub-class stock shares—it also can be inferred that the remaining 70% will affect the second multiplier value of sub-class stock shares. To the extent that dividends are paid to the class C stock shareholders or class A common stock shareholders, this will tend to increase the respective multiplier values based on the percentages stated. To the extent that dividends are paid to sub-class shareholders, this will tend to decrease the respective multiplier values based on the percentages stated. Further, assume that the value of class C stock shares are $100 per share, the value of class A common stock shares are $80 per share and the value of sub-class stock shares are $70 per share. Per share dividend payment to class C stock shareholders is $10. Per share dividend payment to class A common stock shareholders is $8. Per share dividend payment to sub-class shareholders is $7. Based on this information, the adjusted first sub-class multiplier value would be 1.0500.

$$= 1.0000 + ((1.0000 * (8/(80-8))) * 40\%) - (((7*30\%)/(80-8))) +$$
$$(((10*(1-50\%))/(80-8))*0.5000) = 1.0500$$

Referring to FIGS. 19 and 21, a flowchart of a method for determining the adjusted second multiplier value of the second plurality of stock shares 262 in the dual-sub-class will now be explained. The purpose of the adjusted second multiplier value is to update the relationship between a third plurality of stock shares and the second plurality of stock shares based on the dividend amounts paid to the stock shareholders of each stock share of the first plurality of stock shares, the second plurality of stock shares and the third plurality of stock shares. As dividends are paid to the stock shareholders of either the first plurality of stock shares, the second plurality of stock shares, or the third plurality of stock shares, the second multiplier value is subject to adjustments to ensure that value is not inappropriately transferred from one plurality of stock shares to the next.

At step 1300, the client computer 224 determines an adjusted second multiplier value of the second plurality of stock shares 262 utilizing the following equation: Adjusted second multiplier value of the second plurality of stock shares 262=Prior period second multiplier value of the second plurality of stock shares 262+((Prior period second multiplier value of the second plurality of stock shares 262\*(Dividend amount of each stock share of the third plurality of stock shares 260/(Monetary value of each stock share of the third plurality of stock shares 260−Dividend amount of each stock share of the third plurality of stock shares 260)))*Percentage of the third plurality of stock shares dividend allocation affecting the second multiplier value)−(((Dividend amount of each stock share of the second plurality of stock shares 262\*(1−Percentage of the second plurality of stock shares dividend allocation affecting the first multiplier value))/(Monetary value of each stock share of the third plurality of stock shares 260−Dividend amount of each stock share of the third plurality of stock shares 260)))+(((Dividend amount of each stock share of the first plurality of stock shares 250\*(1−Percentage of the first plurality of stock shares 250 dividend allocation affecting the first multiplier value))/(Monetary value of each stock share of the third plurality of stock shares 260−Dividend amount of each stock share of the third plurality of stock shares 260))\*Prior period first multiplier value of the second plurality of stock shares 262).

At step 1302, the client computer 224 stores the adjusted second multiplier value of the second plurality of stock shares 262 in the memory device 225 and/or dividend account database 228.

Exemplary calculations utilizing the methodology of FIG. 19 will now be explained. Assume the same assumptions in the prior example discussed with respect to FIG. 18. Based on this information, the adjusted second sub-class multiplier value would be 0.5267.

$$= 0.5000 + ((0.5000 * (10/(100-10))) * 50\%) -$$
$$(((7*(1-30\%))/(100-10))) +$$
$$(((8*(1-40\%))/(100-10))*1.000) = 0.5267$$

Referring to FIG. 21, a block diagram showing the second plurality of stock shares 262 as a dual-sub-class relative to the first plurality of stock shares 250 and the third plurality of stock shares 260.

Exemplary illustration will now be used to show a practical application of the second plurality of stock shares 262; the aforementioned methods will be used. In this illustration, the first plurality of stock shares 250 will be shown as class A common stock shares, the third plurality of stock shares 260 will be shown as class C (non-voting) stock shares and the second plurality of stock shares 262 will be shown in a dual-sub-class scenario, a sub-class to both class A common stock shares and class C stock shares. For illustrative purposes, diverging assumptions will be used to show how flexible the concept can be. Assume that investors would reinvest dividends back into the company given the chance. Further, assume that the company wants any class of shares that it offers to qualify for mutual funds with dividend mandates. Therefore, the company decides to offer sub-class stock shares with the following characteristics. Sub-class stock shares will have two multiplier values, first multiplier value and second multiplier value. The first multiplier value will dictate the relationship between the sub-class stock shares and class A common stock shares. The second multiplier value will dictate the relationship between the sub-class stock shares and class C stock shares. Also assume that if class A common stock shareholders are paid a dividend, then 1) sub-class shareholders will receive a $1 payment in the form of cash, which will have the effect of reducing the first multiplier value (100%) and no effect on the second multiplier value (0%), 2) 10% of the class A common stock share dividend will go towards changing the first multiplier value, which have the effect of increasing the first multiplier value and, 3) the remaining 90% of the class A common stock share dividend will go towards changing the second multiplier value. Furthermore, the company indicates that 5% of any foregone dividends paid to class C stock shareholders will go towards increasing the first multiplier value with the remaining 95% of foregone dividends going towards increasing the second multiplier value.

Continuing with this dual-sub-class illustration, assume that the first multiplier value is initially 1.0000 and the second multiplier value is 0.0000. This would mean that one sub-class stock share is initially equal to the sum of one class A common stock share (resulting from the first multiplier value of 1.0000) plus zero class C stock shares (resulting from the second multiplier value of 0.0000). Note, if a class C stock share dividend were paid at this point, there would be no affect on the second multiplier value because the second multiplier value is 0.0000. Also assume that the class C stock share has a value of $100 per share. Further, assume that class A common stock shares have a value of $90 per share. Further, when class A common stock shareholders receive a $10 dividend, sub-class shareholders receive $1 in the form of cash. Further, assume that class C stock shares pay a $0 dividend in this period. Using the method described in FIG. 18, the first adjusted multiplier value would be determined by the following:

$$= 1.0000 + ((1.0000*(10/(90-10)))*10\%) - (((1*100\%)/(90-10))) +$$
$$(((0*(1-95\%))/(90-10))*0.0000) = 1.0000$$

The remaining 90% of dividend of the class A common stock share dividend changes the second multiplier value. As indicated previously, the second multiplier value numerically describes the relationship between class C stock shares and the sub-class shares. Using the method described in FIG. 19, the second adjusted multiplier value would be determined by the following:

$$= 0.0000 + ((0.0000*(0/(100-0)))*95\%) -$$
$$(((1*(1-100\%))/(100-0))) +$$
$$(((10*(1-10\%))/(100-0))*1.000) = 0.0900$$

Continuing with the same illustration, in the next time period assume that class C stock shares and class A common stock shares again have a value of $100 and $90 per share, respectively. Assume that a $10 dividend payment were then made to the class C stock shareholders, sub-class shareholders would receive no cash payment. Further, assume that class A common stock shares pay a $0 dividend in this period. As a result, the first and second multiplier values of 1.0000 and 0.0900, respectively, would require adjustments. Using the method described in FIG. 18, the first adjusted multiplier value would be determined by the following:

$$= 1.0000 + ((1.0000*(0/(90-0)))*10\%) - (((0*100\%)/(90-0))) +$$
$$(((10*(1-95\%))/(90-0))*0.0900) = 1.0005$$

Using the method described in FIG. 19, the adjusted second multiplier value would be determined by the following:

$$= 0.0900 + ((0.0900*(10/(100-10)))*95\%) -$$
$$(((0*(1-100\%))/(100-10))) +$$
$$(((0*(1-10\%))/(100-10))*1.000) = 0.0995$$

Based on the adjusted multiplier values, each sub-class stock share would be worth 1.0005 class C stock shares plus 0.0995 class A common stock shares; the marketplace would then determine the value of a sub-class share based on this information. If the marketplace acts rationally, then the sub-class stock shares would have a value of approximately $100.01, which is equal to $90*1.0005+$100*0.0995—assuming that the value of class A common stock shares and class C stock shares have a value of $90 and $100, respectively. In addition to being used as a guide for sub-class stock share valuation, the multiplier value also communicates the amount of votes that the sub-class stock share has relative to other classes of stock shares. Therefore, if each class C stock shares had no voting rights and each class A common stock share had one voting right, the sub-class stock share would have the equivalent of 1.0005 votes for every class A common stock share vote. As time goes on and dividends are paid, the multiplier values will be updated on a compounded basis; as long as the markets remain relatively efficient, the changing multiplier values will also impact the relative value of the sub-class stock shares versus class A common stock share values and class C stock share values. In some instances in which the prior period multiplier value is small, a dividend paid to the sub-class stock shareholders could result in an adjusted first or second multiplier values that are negative. This should be avoided as a negative multiplier value would imply that the class A common stock shares or class C stock shares would be entitled to value from the sub-class share, which may fall outside of the original definition of the class A common stock shares or class C stock shares. However, this concept is sufficiently flexible to adjust for this possibility if the issuing company defines the parameters of a negative multiplier value.

The system and methodology are sufficiently flexible to properly adjust the first and second multiplier values regardless of how complex the dividend payment and foregone dividend payment schemes can be. Although the previous illustrations illustrate two embodiments, the concept can easily be adapted to include a complex web of relationships among classes and sub-classes of stock shares via a multiplier value. The concept can be adapted to have type N multiplier values, where N can be any number linking types of stock shares that the company has created.

The system and methodology are sufficiently flexible to properly adjust the multiplier values in the event that any of the classes or sub-classes undergoes a stock split or reverse split. For example, if every one of the third plurality of stock shares 260 will be split into two stock shares, every two of the first plurality of stock shares 250 is reverse split into one share and the second plurality of stock shares 262 does not undergo any split or reverse split, than the prevailing first multiplier value would be adjusted by decreasing it by a factor of 0.5, while the second multiplier value would be adjusted by increasing it by a factor of 2.0.

The system and the method for allocating dividends provide a substantial advantage over other systems and methods. In particular, the system and method provide a technical effect of utilizing sub-classes of stock shares wherein an amount of money that the company would normally set aside to pay dividends is instead used to create custom dividend payment schedules. Moreover, with the high degree of flexibility provided by this concept, companies could easily design multiple sub-classes with diverging dividend mandates that provide investors customized investment vehicles. Furthermore, because sub-classes can be of various sizes, the concept is specifically designed to enable companies to reduce total cash dividend payments while spending the remaining funds available for dividends to buy back classes and sub-classes of stock shares. Further, the concept described within this application outlines how dividend payments can be dynamic in nature without inappropriately transferring value or voting rights between classes and sub-classes of stock shares. Other embodiments are not limited to, but may include dividends set at a certain level in terms of dollars or percentages relative to the value of the first plurality of stock shares 250, dividends that get adjusted for inflation, dividends that start and end at certain time periods, dividends that are conditional upon corporate factors, dividends that act like a poison pill, dividends that pay a 100% dividend at a certain point in time and simulate elements of a zero coupon bond. Also benefits of foregone dividends could result in accumulation of value in very creative ways such as, but not limited to, entitlement to assets of the company, to products that the company offers, to other classes and sub-classes, to fixed income instruments, to specific operations, to equity in affiliates, to equity in divisions that eventually are divested or to derivative products. To the extent that a company allocates dividend payments to shareholders that are less than the total amount of funds available for dividends, stock buyback of any or all classes and sub-classes in any combination ensures that all value is being concentrated in the remaining shares appropriately. To the extent that a company allocated dividend payments to shareholders that are equal to the total amount of funds available for dividends, the company is not obligated to buy back any shares; therefore, the number or portion of shares in the stock buyback could be zero. Further, some of the calculation examples in this application include rounded numbers; this is not intended to limit the precision of the calculations, but to simplify the examples. The actual numbers used in and generated from the aforementioned steps should be sufficiently precise such that the resulting multiplier values do not inadvertently transfer value from one class of stock shares to another over time.

The terms "class" and "Class" are used interchangeably herein and have the same meaning.

Furthermore, although the embodiment described herein describes how classes and sub-classes of stock shares could trade in the marketplace concurrently, it is foreseeable that the sub-class of stock shares may not always be traded freely due to limited or low volumes of shares trading ownership. Therefore, the multiplier value will then serve as a guide, irrespective of market inefficiencies. Further, the value and relationship dictated by the multiplier values may also be used as a basis for, but not limited to, the following: management compensation, phantom share valuations, and derivatives valuations.

The above-described methods can be at least partially embodied in the form of one or more computer readable medium having computer-executable instructions for practicing the method. The computer-readable medium can comprise one or more of the following: floppy diskettes, CD-ROMs, hard drives, flash memory, and other computer-readable medium known to those skilled in the art; wherein, when the computer-executable instructions are loaded into and executed by one or more computers or computer servers, the one or more computers or computer servers become an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Other examples of shares may include but are not limited to preferred shares, privileged voting shares, and other types of assets or derivative products that may be exploited using the basic principles outlined herein. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A method for allocating dividends to stock shares, comprising:

issuing a group of stock shares having a first plurality of stock shares in a first stock share class and a second plurality of stock shares in a sub-class of the first stock share class, the sub-class of the first stock share class having an amount of votes that is determined based on an amount of votes of the first stock share class and a multiplier value, the multiplier value being adjusted over time;

allocating a first percentage of a total dividend amount associated with the group of stock shares to the first plurality of stock shares in the first stock share class utilizing a computer;

allocating a second percentage of the total dividend amount to the second plurality of stock shares in the sub-class of the first stock share class utilizing the computer;

storing the first percentage of the total dividend amount and the second percentage of the total dividend amount in a memory device, utilizing the computer; and determining the amount of votes of the second plurality of stock shares in the sub-class of the first stock share class by multiplying the amount of votes of the first plurality of stock shares in the first stock share class by the multiplier value utilizing the computer, the multiplier value being determined based on the allocating of the first percentage of the total dividend amount and the allocating of the second percentage of the total dividend amount utilizing the computer.

2. The method of claim 1, further comprising performing a share buyback of a portion of the first plurality of stock shares and a portion of the second plurality of stock shares, utilizing a monetary amount substantially equal to the total dividend amount minus the first percentage of the total dividend amount, and minus the second percentage of the total dividend amount.

3. The method of claim 1, further comprising performing a share buyback of a portion of the first plurality of stock shares or a portion of the second plurality of stock shares, utilizing a monetary amount substantially equal to the total dividend amount minus the first percentage of the total dividend amount, and minus the second percentage of the total dividend amount.

4. The method of claim 1, further comprising:
distributing the first percentage of the total dividend amount to dividend accounts of owners of the first plurality of stock shares in the first stock share class; and
distributing the second percentage of the total dividend amount to dividend accounts of owners of the second plurality of stock shares in the sub-class of the first stock share class.

5. A system for allocating dividends to stock shares, comprising:
a first computer configured to sell a group of stock shares having a first plurality of stock shares in a first stock share class and a second plurality of stock shares in a sub-class of the first stock share class, the sub-class of the first stock share class having an amount of votes that is determined based on an amount of votes of the first stock share class and a multiplier value, the multiplier value being adjusted over time;
a second computer configured to allocate a first percentage of a total dividend amount associated with the group of stock shares to the first plurality of stock shares in the first stock share class;
the second computer further configured to allocate a second percentage of the total dividend amount to the second plurality of stock shares in the sub-class of the first stock share class;
the second computer further configured to store the first percentage of the total dividend amount and the second percentage of the total dividend amount in a memory device; and
the second computer further configured to determine the amount of votes of the second plurality of stock shares in the sub-class of the first stock share class by multiplying the amount of votes of the first plurality of stock shares in the first stock share class by the multiplier value, the second computer further configured to determine the multiplier value based on the allocation of the first percentage of the total dividend amount and the allocation of the second percentage of the total dividend amount.

6. The system of claim 5, wherein the second computer further configured to send a message to instruct the first computer to perform a share buyback of a portion of the first plurality of stock shares and a portion of the second plurality of stock shares, utilizing a monetary amount substantially equal to the total dividend amount minus the first percentage of the total dividend amount, and minus the second percentage of the total dividend amount.

7. The system of claim 5, wherein the second computer further configured to send a message to instruct the first computer to perform a share buyback of a portion of the first plurality of stock shares or a portion of the second plurality of stock shares, utilizing a monetary amount substantially equal to the total dividend amount minus the first percentage of the total dividend amount, and minus the second percentage of the total dividend amount.

8. The system of claim 5, wherein:
the second computer further configured to send a message to instruct the first computer to distribute the first percentage of the total dividend amount to dividend accounts of owners of the first plurality of stock shares in the first stock share class; and
the second computer further configured to send a message to instruct the first computer to distribute the second percentage of the total dividend amount to dividend accounts of owners of the second plurality of stock shares in the sub-class of the first stock share class.

9. A method for allocating dividends to a group of stock shares, comprising:
issuing the group of stock shares having a first plurality of stock shares in a first stock share class, a third plurality of stock shares in a second stock share class, and a second plurality of stock shares in both a sub-class of the first stock share class and a sub-class of the second stock share class; the second plurality of stock shares having an amount of votes determined based on an amount of votes of the first stock share class and a first multiplier value, and an amount of votes of the second stock share class and a second multiplier value; the first and second multiplier values being adjusted over time;
allocating a first percentage of a total dividend amount associated with the group of stock shares to the first plurality of stock shares in the first stock share class utilizing a computer;
allocating a second percentage of the total dividend amount to the second plurality of stock shares in both the sub-class of the first stock share class and the sub-class of the second stock share class utilizing the computer;
allocating a third percentage of the total dividend amount to the third plurality of stock shares in the second stock share class utilizing the computer;
storing the first percentage of the total dividend amount, the second percentage of the total dividend amount, and the third percentage of the total dividend amount in a memory device, utilizing the computer;
determining the amount of votes of the second plurality of stock shares in both the sub-class of the first stock share class and the sub-class of the second stock share class utilizing the computer by:
multiplying the amount of votes of the first plurality of stock shares in the first stock share class by the first multiplier value to obtain a first value, the first multiplier value being determined based on the allocating of the first percentage of the total dividend amount, and the allocating of the second percentage of the total dividend amount, and the allocating of the third percentage of the total dividend amount;
multiplying the amount of votes of the third plurality of stock shares in the second stock share class by the second multiplier value to obtain a second value, the second multiplier value being determined based on the allocating of the first percentage of the total dividend amount, and the allocating of the second percentage of the total dividend amount, and the allocating of the third percentage of the total dividend amount; and
adding the first and second values to obtain the amount of votes of the second plurality of stock shares.

10. The method of claim 9, further comprising performing a share buyback of a portion of the first plurality of stock shares and a portion of the second plurality of stock shares and a portion of the third plurality of stock shares, utilizing a monetary amount substantially equal to the total dividend amount minus the first percentage of the total dividend amount, minus the second percentage of the total dividend amount, and minus the third percentage of the total dividend amount.

11. The method of claim 9, further comprising performing a share buyback of a portion of the first plurality of stock shares or a portion of the second plurality of stock shares or a portion of the third plurality of stock shares, utilizing a monetary amount substantially equal to the total dividend amount minus the first percentage of the total dividend amount, minus the second percentage of the total dividend amount, and minus the third percentage of the total dividend amount.

12. The method of claim 9, further comprising:
distributing the first percentage of the total dividend amount to dividend accounts of owners of the first plurality of stock shares in the first stock share class;
distributing the second percentage of the total dividend amount to dividend accounts of owners of the second plurality of stock shares in both the sub-class of the first stock share class and the sub-class of the second stock share class; and
distributing the third percentage of the total dividend amount to the dividend accounts of owners of the third plurality of stock shares in the sub-class of the second stock share class.

13. A system for allocating dividends to a group of stock shares, comprising:
a first computer configured to sell the group of stock shares having a first plurality of stock shares in a first stock share class, a third plurality of stock shares in a second stock share class, and a second plurality of stock shares in both a sub-class of the first stock share class and a sub-class of the second stock share class; the second plurality of stock shares having an amount of votes determined based on an amount of votes of the first stock share class and a first multiplier value, and an amount of votes of the second stock share class and a second multiplier value; the first and second multiplier values being adjusted over time;
a second computer further configured to allocate a first percentage of a total dividend amount associated with the group of stock shares to the first plurality of stock shares in the first stock share class;
the second computer further configured to allocate a second percentage of the total dividend amount to the second plurality of stock shares in both the sub-class of the first stock share class and the sub-class in the second stock share class;
the second computer further configured to allocate a third percentage of the total dividend amount to the third plurality of stock shares in the second stock share class;
the second computer further configured to store the first percentage of the total dividend amount, the second percentage of the total dividend amount, and the third percentage of the total dividend amount in a memory device;
the second computer further configured to determine the amount of votes of the second plurality of stock shares in both the sub-class of the first stock share class and the sub-class of the second stock share class by:
multiplying the amount of votes of the first plurality of stock shares in the first stock share class by the first multiplier value to obtain a first value, the first multiplier value being determined based on the allocation of the first percentage of the total dividend amount, and the allocation of the second percentage of the total dividend amount, and the allocation of the third percentage of the total dividend amount;
multiplying the amount of votes of the third plurality of stock shares in the second stock share class by the second multiplier value to obtain a second value, the second multiplier value being determined based on the allocation of the first percentage of the total dividend amount, and the allocation of the second percentage of the total dividend amount, and the allocation of the third percentage of the total dividend amount; and
adding the first and second values to obtain the amount of votes of the second plurality of stock shares.

14. The system of claim 13, wherein the second computer further configured to send a message to instruct the first computer to perform a share buyback of a portion of the first plurality of stock shares and a portion of the second plurality of stock shares and a portion of the third plurality of stock shares, utilizing a monetary amount substantially equal to the total dividend amount minus the first percentage of the total dividend amount, minus the second percentage of the total dividend amount, and minus the third percentage of the total dividend amount.

15. The system of claim 13, wherein the second computer further configured to send a message to instruct the first computer to perform a share buyback of a portion of the first plurality of stock shares or a portion of the second plurality of stock shares or a portion of the third plurality of stock shares, utilizing a monetary amount substantially equal to the total dividend amount minus the first percentage of the total dividend amount, minus the second percentage of the total dividend amount, and minus the third percentage of the total dividend amount.

16. The system of claim 13, wherein:
the second computer further configured to send a message to instruct the first computer to distribute the first percentage of the total dividend amount to dividend accounts of owners of the first plurality of stock shares in the first stock share class;
the second computer further configured to send a message to instruct the first computer to distribute the second percentage of the total dividend amount to dividend accounts of owners of the second plurality of stock shares in both the sub-class of the first stock share class and the sub-class of the second stock share class; and
the second computer further configured to instruct the first computer to distribute the third percentage of the total dividend amount to the dividend accounts of owners of the third plurality of stock shares in the sub-class of the second stock share class.

* * * * *